United States Patent
Dresevic et al.

(10) Patent No.: US 7,006,711 B2
(45) Date of Patent: Feb. 28, 2006

(54) TRANSFORM TABLE FOR INK SIZING AND COMPRESSION

(75) Inventors: Bodin Dresevic, Bellevue, WA (US); Rudolph Balaz, Redmond, WA (US); Gregory Nicholas Hullender, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 982 days.

(21) Appl. No.: 09/891,512

(22) Filed: Jun. 27, 2001

(65) Prior Publication Data

US 2002/0049796 A1 Apr. 25, 2002

Related U.S. Application Data

(60) Provisional application No. 60/212,825, filed on Jun. 21, 2000.

(51) Int. Cl.
*G06K 9/32* (2006.01)
*G06K 9/00* (2006.01)

(52) U.S. Cl. .................................. 382/299; 382/187
(58) Field of Classification Search ......... 382/187–198, 382/293–300
See application file for complete search history.

(56) References Cited

U.S. PATENT DOCUMENTS

| | | | |
|---|---|---|---|
| 4,156,237 A | 5/1979 | Okata et al. | |
| 5,146,552 A | 9/1992 | Cassorla et al. | |
| 5,148,155 A | * 9/1992 | Martin et al. | 345/173 |
| 5,239,466 A | 8/1993 | Morgan et al. | |
| 5,434,965 A | 7/1995 | Matheny et al. | |
| 5,465,325 A | * 11/1995 | Capps et al. | 345/441 |
| 5,473,742 A | 12/1995 | Polyakov et al. | |
| 5,509,663 A | 4/1996 | Otake et al. | |

(Continued)

FOREIGN PATENT DOCUMENTS

| | | |
|---|---|---|
| EP | 902379 A2 | 3/1999 |
| EP | 1 016 983 A2 | 7/2000 |
| WO | 96/20908 | 7/1996 |
| WO | WO 97/22109 | 6/1997 |
| WO | 98/06054 | 2/1998 |
| WO | 87/01481 | 3/1998 |
| WO | 98/09446 | 3/1998 |
| WO | 99/49383 | 9/1999 |

OTHER PUBLICATIONS

Baxes, Gregory A., Digital Image Processiing, 1994, John Wiley & Sons, Inc., ISBN 0–471–00949–0.*
Franklin, S. M and Peters, A.M., Device–Independent Bitmap Sizing, Mar. 1990, IBM Technical Disclosure Bulletin, vol. 32, No. 10A, p. 169.*

(Continued)

*Primary Examiner*—Mehrdad Dastouri
*Assistant Examiner*—Sath Perungavoor
(74) *Attorney, Agent, or Firm*—Banner & Witcoff, Ltd.

(57) ABSTRACT

The present invention relates to storing information including electronic ink. Ink is stored in a data structure that includes a mapping of the ink's coordinates from one space to another. The responsibility of transforming the ink into desired coordinates occurs after the capture of the ink and at least based on the mapping in the data structure.

10 Claims, 13 Drawing Sheets

U.S. PATENT DOCUMENTS

| | | | |
|---|---|---|---|
| 5,534,893 A | * 7/1996 | Hansen et al. | 345/179 |
| 5,572,643 A | 11/1996 | Judson | |
| 5,613,019 A | 3/1997 | Altman et al. | |
| 5,625,833 A | 4/1997 | Levine et al. | |
| 5,632,022 A | 5/1997 | Warren et al. | |
| 5,680,480 A | * 10/1997 | Beernink et al. | 382/187 |
| 5,680,636 A | 10/1997 | Levine et al. | |
| 5,682,439 A | 10/1997 | Beernink et al. | |
| 5,687,331 A | 11/1997 | Volk et al. | |
| 5,717,879 A | 2/1998 | Moran et al. | |
| 5,727,129 A | 3/1998 | Barrett et al. | |
| 5,729,687 A | 3/1998 | Rothrock et al. | |
| 5,737,599 A | 4/1998 | Rowe et al. | |
| 5,745,116 A | 4/1998 | Pisutha-Arnond | |
| 5,760,773 A | 6/1998 | Berman et al. | |
| 5,778,404 A | 7/1998 | Capps et al. | |
| 5,790,818 A | 8/1998 | Martin | |
| 5,801,687 A | 9/1998 | Peterson et al. | |
| 5,818,456 A | 10/1998 | Cosman et al. | |
| 5,821,925 A | 10/1998 | Carey et al. | |
| 5,832,263 A | 11/1998 | Hansen et al. | |
| 5,838,914 A | 11/1998 | Carleton et al. | |
| 5,845,262 A | 12/1998 | Nozue et al. | |
| 5,877,757 A | 3/1999 | Baldwin et al. | |
| 5,889,523 A | 3/1999 | Wilcox et al. | |
| 5,893,126 A | 4/1999 | Drews et al. | |
| 5,893,132 A | 4/1999 | Huffman et al. | |
| 5,918,236 A | 6/1999 | Wical | |
| 5,920,647 A | * 7/1999 | Nowlan et al. | 382/187 |
| 5,920,694 A | 7/1999 | Carleton et al. | |
| 5,931,912 A | 8/1999 | Wu et al. | |
| 5,933,140 A | 8/1999 | Strahorn et al. | |
| 5,937,416 A | 8/1999 | Menzel | |
| 5,948,040 A | 9/1999 | DeLorme et al. | |
| 5,950,214 A | 9/1999 | Rivette et al. | |
| 5,978,818 A | 11/1999 | Lin | |
| 5,983,248 A | 11/1999 | De Rose et al. | |
| 5,986,665 A | 11/1999 | Wrey et al. | |
| 6,011,537 A | 1/2000 | Slotznick | |
| 6,012,055 A | 1/2000 | Campbell et al. | |
| 6,018,334 A | 1/2000 | Eckerberg et al. | |
| 6,018,342 A | 1/2000 | Bristor | |
| 6,018,742 A | 1/2000 | Herbert, III | |
| 6,035,330 A | 3/2000 | Astiz et al. | |
| 6,049,812 A | 4/2000 | Bertram et al. | |
| 6,052,514 A | 4/2000 | Gill et al. | |
| 6,054,990 A | 4/2000 | Tran | |
| 6,081,829 A | 6/2000 | Sidana | |
| 6,088,481 A | 7/2000 | Okamoto et al. | |
| 6,091,930 A | 7/2000 | Mortimer et al. | |
| 6,094,197 A | 7/2000 | Buxton et al. | |
| 6,101,280 A | 8/2000 | Reynolds | |
| 6,118,437 A | 9/2000 | Fleck et al. | |
| 6,122,649 A | 9/2000 | Kanerva et al. | |
| 6,128,007 A | 10/2000 | Seybold | |
| 6,157,381 A | 12/2000 | Bates et al. | |
| 6,181,344 B1 | 1/2001 | Tarpenning et al. | |
| 6,195,679 B1 | 2/2001 | Bauersfeld et al. | |
| 6,195,694 B1 | 2/2001 | Chen et al. | |
| 6,199,082 B1 | 3/2001 | Ferrel et al. | |
| 6,201,528 B1 | 3/2001 | Lucas et al. | |
| 6,205,455 B1 | 3/2001 | Umen et al. | |
| 6,230,171 B1 | 5/2001 | Pacifici et al. | |
| 6,239,792 B1 | 5/2001 | Yanagisawa et al. | |
| 6,262,719 B1 | 7/2001 | Bi et al. | |
| 6,271,840 B1 | 8/2001 | Finseth et al. | |
| 6,279,005 B1 | 8/2001 | Zellweger | |
| 6,279,014 B1 | 8/2001 | Schilit et al. | |
| 6,289,362 B1 | 9/2001 | Van Der Meer | |
| 6,301,590 B1 | 10/2001 | Siow et al. | |
| 6,321,244 B1 | 11/2001 | Liu et al. | |
| 6,331,867 B1 | 12/2001 | Eberhard et al. | |
| 6,335,727 B1 | 1/2002 | Morishita et al. | |
| 6,340,967 B1 | 1/2002 | Maxted | |
| 6,356,287 B1 | 3/2002 | Ruberry et al. | |
| 6,369,811 B1 | 4/2002 | Graham et al. | |
| 6,373,490 B1 | 4/2002 | Bendiksen et al. | |
| 6,389,434 B1 | 5/2002 | Rivette et al. | |
| 6,393,422 B1 | 5/2002 | Wone | |
| 6,405,221 B1 | 6/2002 | Levine et al. | |
| 6,421,065 B1 | 7/2002 | Walden et al. | |
| 6,446,110 B1 | 9/2002 | Lection et al. | |
| 6,460,058 B1 | 10/2002 | Koppolu et al. | |
| 6,486,895 B1 | 11/2002 | Robertson et al. | |
| 6,490,603 B1 | 12/2002 | Keenan et al. | |
| 6,535,294 B1 | 3/2003 | Arledge, Jr. et al. | |
| 6,539,370 B1 | 3/2003 | Chang et al. | |
| 6,549,220 B1 | 4/2003 | Hsu et al. | |
| 6,549,675 B1 | 4/2003 | Chatterjee | |
| 6,560,621 B1 | 5/2003 | Barile | |
| 6,563,503 B1 | 5/2003 | Comair et al. | |
| 6,571,295 B1 | 5/2003 | Sidana | |
| 2002/0013795 A1 | 1/2002 | Dresevic et al. | |
| 2002/0097261 A1 | 7/2002 | Gottfurcht et al. | |

OTHER PUBLICATIONS

Microsoft Windows Graphical Environment for Pen Computing User's Guide, date unknown.
Microsoft® Windows Graphical Environment for Pen Computing SDK Guide to Pen Programming Beta Release Aug. 2, 1991.
Interchange Format Files document.
WAVE PCM soundfile format.
Morrison "EA EFF 85" Standard for Interchange Format Files, Jan., 1985.
Ressource Interchange Format.
Opening a RIFF File for reading or writing.
Interchange File Format.
Graphics File Formats FAQ (Part 1 of 4): General Graphics Format Questions.
Graphics File Formats FAQ (Part 2 of 4): Image Conversion and Display Programs.
Graphics File Formats FAQ (Part 3 of 4): Where to Get File Format Specifications.
Graphics File Formats FAQ (Part 4 of 4): Tips and Tricks of the Trade.
Resource Interchange File Format Services.
Interchange file format header file (Iff.h).
Center for Innovative Computer Applications.
HIFF Format Specification.
European Search Report dated Jul. 8, 2004.
Bill N. Schilit et al., "Digital Library Information", FX Palo Alto Laboratory, Palo Alto, CA.
Bill N. Schilit et al., "Digital Library Information Appliances", pp. 217–225, 1998.
Graphics Interchange Format (sm), Version 89a, 1990, CompuServe Incorporated.
JOT—A Specification for Ink Storage and Interchange Format, 1996.
Aref et al., "The Handwritten Trie: Indexing Electronic Ink," SIGMOD '95, 1995, pp. 151–162.
Aref et al., "On Handling Electronic Ink", ACM Computing Surveys, vol. 27, No. 4, Dec. 1995, pp. 564–567.
Uchihashi et al., "Automatic Index Creation for Handwritten Notes," IEEE Int. Conf. On Acoustics, Speech, and Signal Processing, vol. 6, Mar. 15, 1999, pp. 3453–3456.

Microsoft® Windows Graphical Environment for Pen Computing SDK, Guide to Pen Programming, Aug. 2, 1991.

Microsoft Windows Graphical Environment for Pen Computing—Introduction to Microsoft Windows for Pen Computing, pp. 1–13.

Internet Printout: About Interchange File Format, http://www.borg.com, dated May 10, 2001.

Internet Printout: http://ccrma–www.stanford.edu, WAVE PCM soundfile format, dated May 10, 2001.

"EA IFF 85" Standard for Interchange Format Files.

Internet Printout: http://www.daubnet.com/formats/RIFF-.html, Ressource Interchange Format, dated May 10, 2001.

Internet Printout: http://www.borg.com, Opening a RIFF file for reading or writing, dated May 10, 2001.

Internet Printout: http://www.burks.brighton.ac.uk/burks/foldoc/32/57.htm, Interchange File Format, dated May 10, 2001.

Internet Printout: http://www.faqs.org/faqs/graphics/fileformats-faq/part1/preamble.html, Graphics File Formats FAQ (Part 1 of 4): General Graphics Format Questions, dated May 10, 2001.

Internet Printout: http://www.faqs.org/faqs/graphics/fileformats-faq/part2/preamble.html, Graphics File Formats FAQ (Part 2 of 4): Image Conversion and Display Programs, dated May 10 2001.

Internet Printout: http://www.faqs.org/faqs/graphics/fileformats-faq/part3/preamble.html, Graphics File Formats FAQ (Part 3 of 4): Where to Get File Format Specifications, dated May 10 2001.

Internet Printout: http://www.faqs.org/faqs/graphics/fileformats-faq/part4/preamble.html, Graphics File Formats FAQ (Part 4 of 4): Tips and Tricks of the Trade, dated May 10 2001.

Internet Printout: http://www.msdn.microsoft.com/library/psdk/multimed/mmio, Resource Interchange File Format Services, dated May 10, 2001.

Internet Printout: http://n.ethz.ch/student/hhug/simpl/doc/iff_h-source.html, iff.h, dated May 10, 2001.

Internet Printout: http://www.cica.indiana.edu/graphics/image.formats.html, Center for Innovative Computer Applications, dated May 10, 2001.

Internet Printout: http://www.timestream.com/mmedia/making/hiffl.html, HIFF Format Specification, dated May 10, 2001.

European Search Report dated Jul. 8, 2004.

aha! InkWriterJ The simplicity of pen and paper, the power of word processing., Advertisement, 1993, 2 pp., aha! Software corporation, Mountainview, CA.

aha! InkWriterJ for Magic Cap "The fastest, most convenient way to create faxes, notes and messages." Advertisement, 1993, 1994, 2 pp., aha! Software corporation, Mountain View, CA.

aha! 2.0 for Windows InkWriterJ The power of word processing, the convenience of pen and paper, Advertisement, 1994, 1995, 2 pp., aha! Software corporation, Mountain View, CA.

aha! software products, Web Page List of Products, Sep. 24, 1997, pp. 1–5, aha! software corporation, Mountain View, CA.

"Adobe Acrobat 3.0 Reader Online Guide", Adobe Systems, Inc., pp. 1–110.

Kunikasu, T., Patent Abstracts of Japan, Publication No. 11327789 for Color Display and Electronic Blackboard System, published Nov. 30, 1999.

Open eBook Forum, Open eBook™ Publication Structure 1.0, Sep. 1999 http://www.ebxwg.org/oebps/oebps1.0/download/oeb1–oebps.htm.

Kristensen, A., Formsheets and the XML Forms Language (Mar. 1999).

Dublin Core Resource Types: Structurality DRAFT: Jul. 24, 1997, Feb. 27, 1998.

Dublin Core Metadata Element Set, Version 1.1: Reference Description; 1999.

Dublin Core Metadata Initiative: User Guide Working Draft Jul. 31, 1998; 1999.

Softbook®Press, The Leader in Internet–Enabled Document Distribution and Reading Systems; 1999 http://www.softbook.com/consumer/reader.asp.

Robert eBook Using the Rocket eBook, 1999; http://www.rocketbook.com/Products/Faq/using.html.

Explore the Features of the Rocket eBook; wysiwyg://212http://www.rocketbook.com/Products/Tour/index.html; publication date unknown, prior to filing application.

Hirotsu et al., "Cmew/U–13 A Multimedia Web Annotation Sharing System", NTT Network Innovation Laboratories—Japan, III, 1999, pp. 356–359.

Kuo et al., "A Synchronization Scheme for Multimedia Annotation", Multimedia Information Networking Laboratory, Tamkang University—Taiwan, IEEE, 1997, pp. 594–598.

Patent Abstracts of Japan, Publication No. 11327789 for Color Display and Elecronic Blackboard System, publication date Nov. 30, 1999.

James D. Foley, et al., "Computer Graphics: Principles and Practices", $2^{nd}$ Edition, 1990, pp. 835–840.

Gerald E. Farin, "Curves and Surfaces for Computer Aided Geometric Design a Practical Guide", $2^{nd}$ Edition, 1990, pp. 37–41.

Angelfire Webpage, "Curve Fitting and the Method of Least Squares", http://www.angelfire.com/ak4/neurope/ls.html, printed Jul. 6, 2001, 13 pages.

John D. Hobby, "Rasterizing Curves of Constant Width", Journal of the Association for Computing Machinery, vol. 36, No. 2, Apr. 1989, pp. 209–229.

Graphics Interchange Formal (sm), Version 89a, 1990, CompuServe Incorporated.

JOT —A Specification for an ink Storage and Interchange Format. 1996.

AREF et al., "The Handwritten Trie: Indexing Electronic Ink," SIGMOD '95, 1995, pp. 151–162.

AREF et al., "On Handling Electronic Ink", ACM Computing Surveys, vol. 27, No. 4, Dec. 1995, pp. 564–567.

Uchihashi et al., "Automatic Index Creation for Handwritten Notes," IEEE Int. Conf. on Acoustics, Speech, and Signal Processing, vol. 6, Mar. 15, 1999, pp. 3453–3456.

* cited by examiner

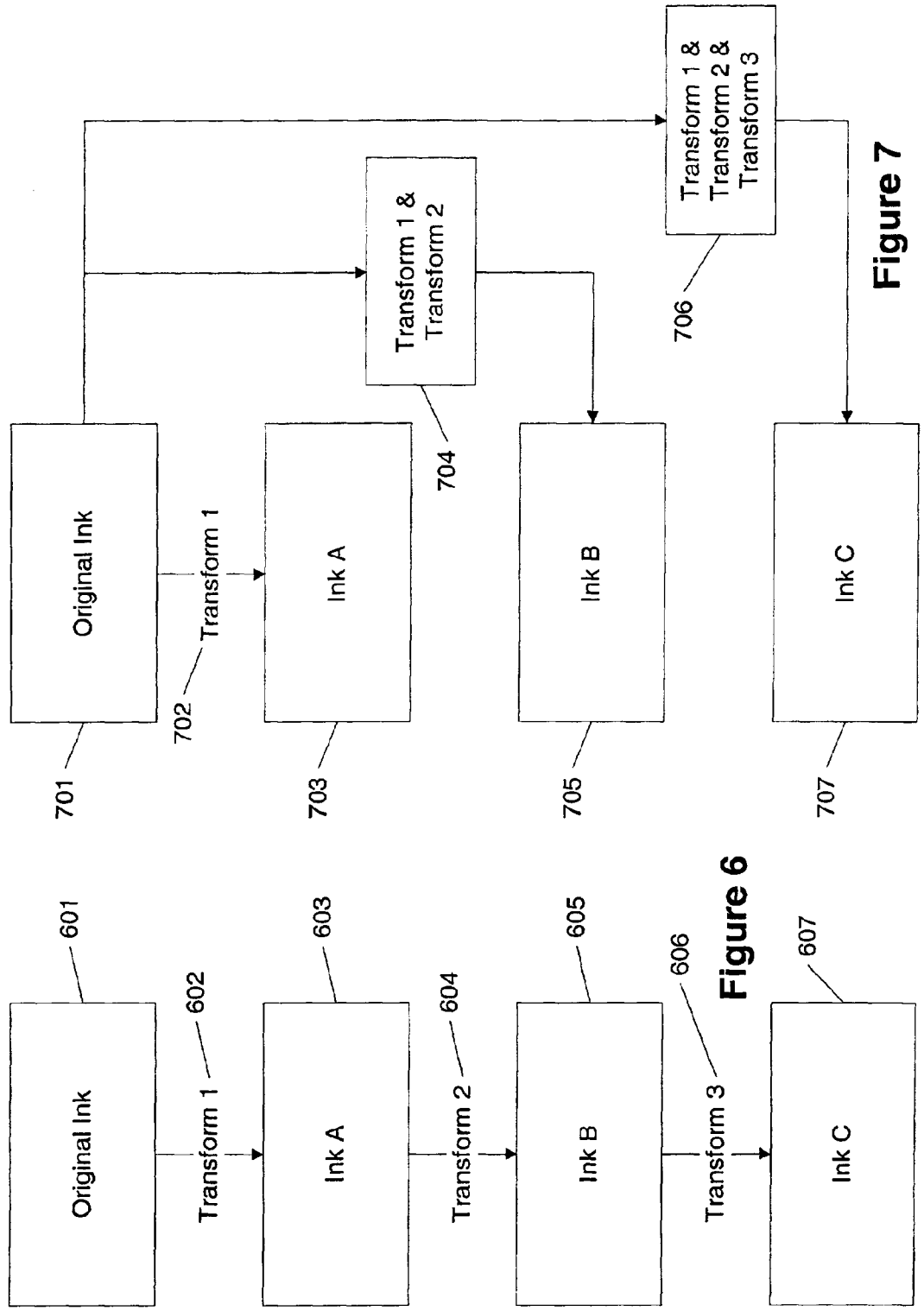

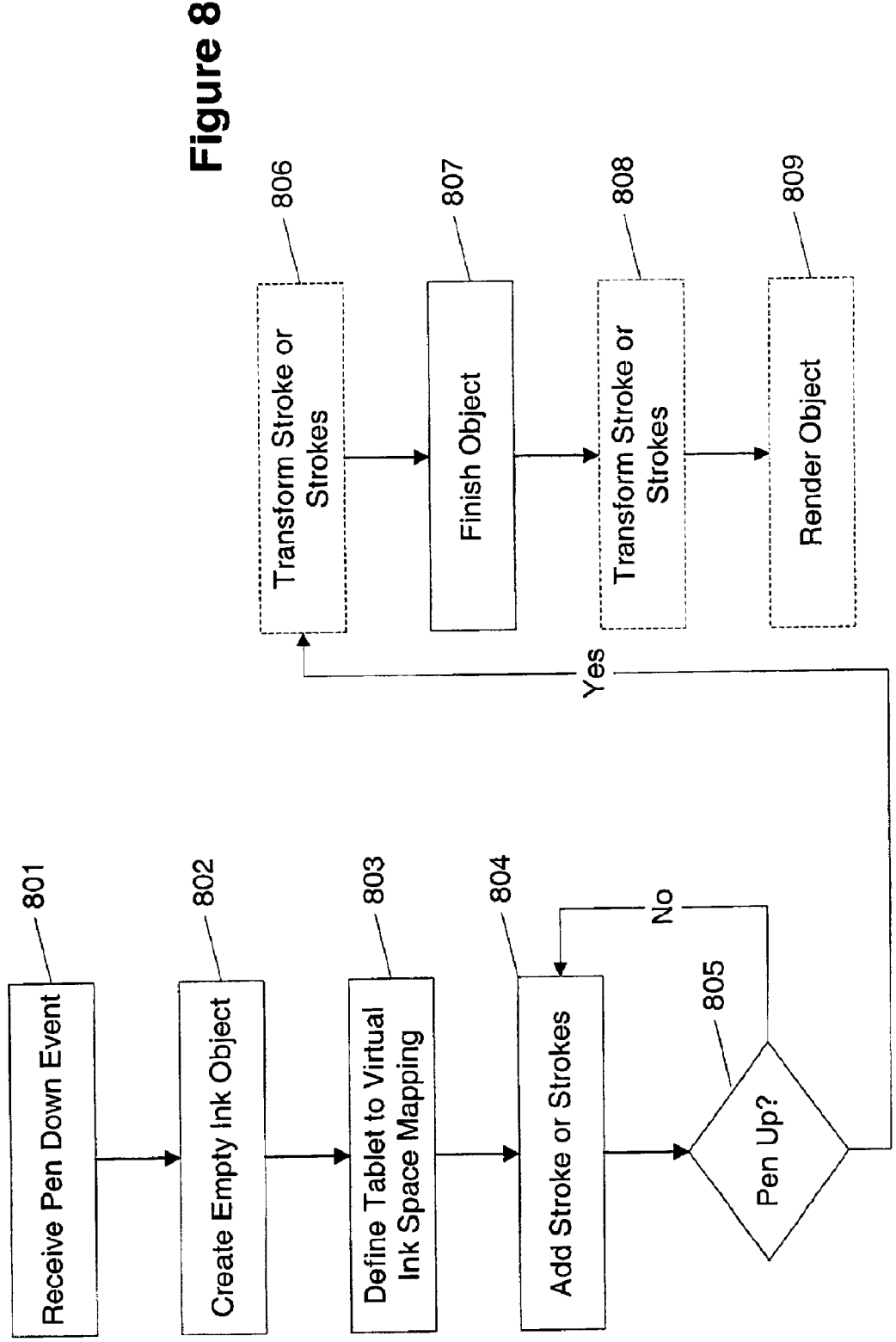

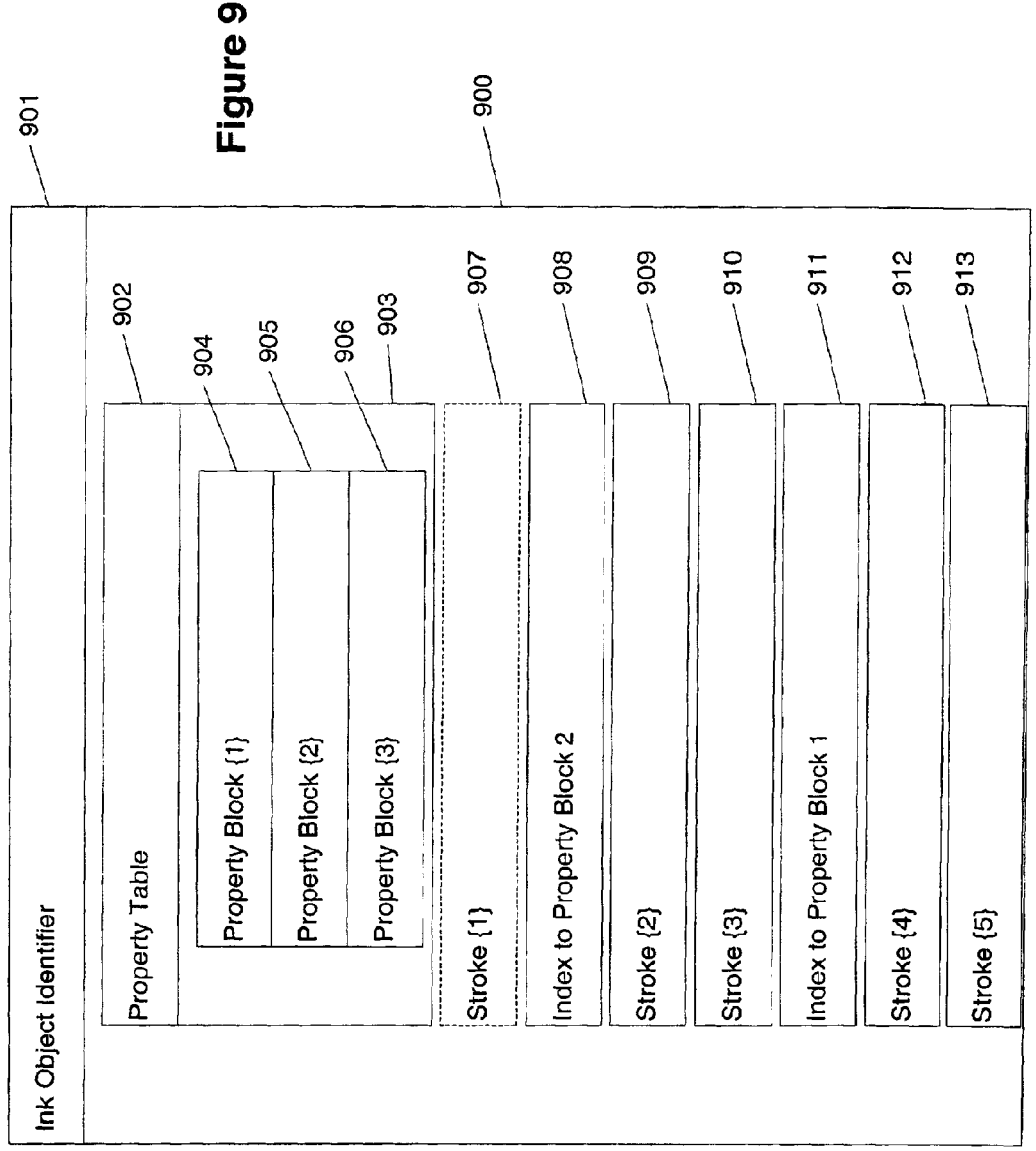

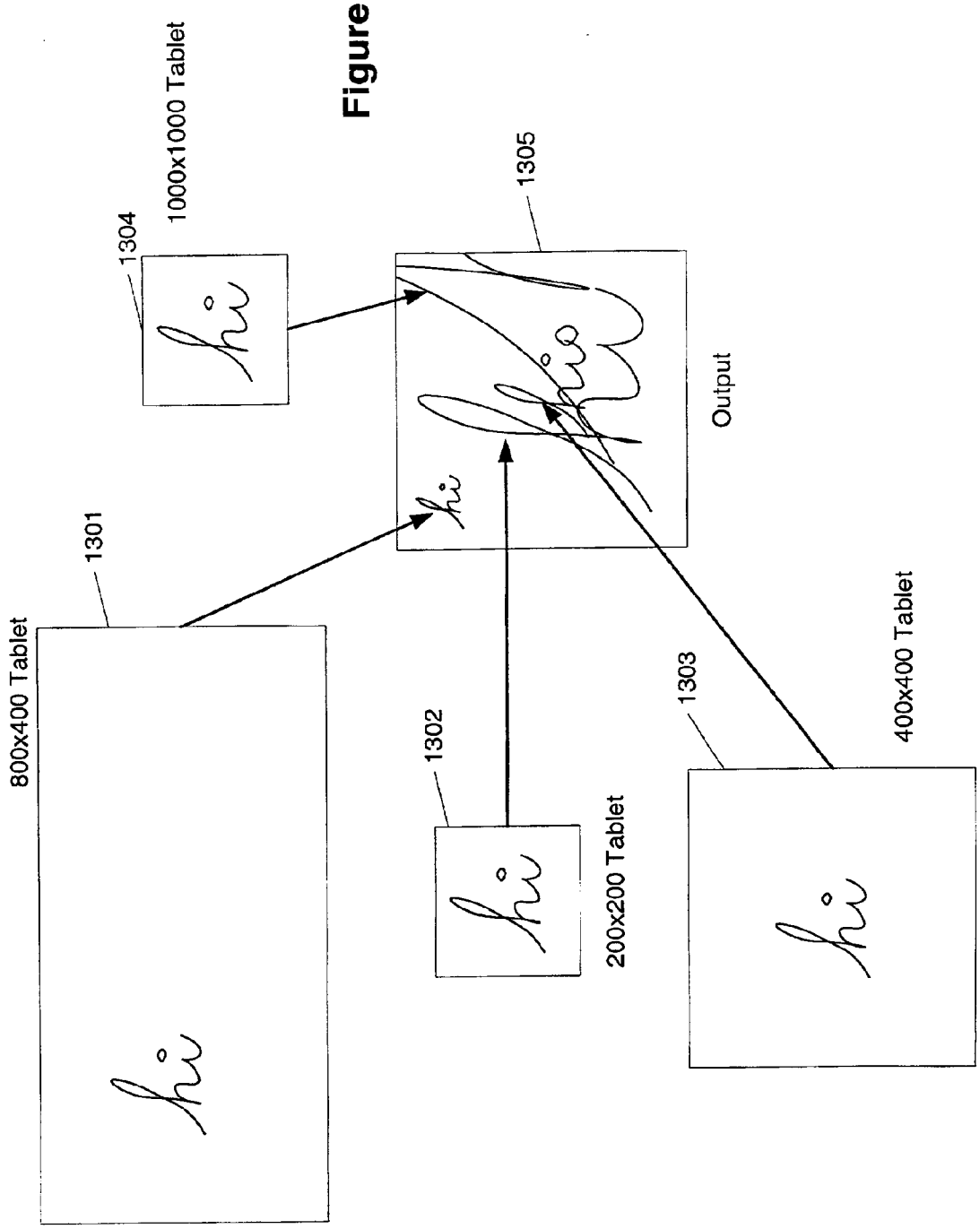

TRANSFORM TABLE FOR INK SIZING AND COMPRESSION

CROSS-REFERENCE TO RELATED APPLICATIONS

This application is related to U.S. Application No. 60/212,825, entitled "Methods for Classifying, Anchoring, and Transforming Ink Annotations", filed Jun. 21, 2000, to U.S. application Ser. No. 09/750,288, entitled "Classifying, Anchoring, and Transforming Ink", filed Dec. 29, 2000, to U.S. application Ser. No. 09/852,799 (BW 03797.00132), entitled "Serial Storage of Ink and Its Properties", filed May 11, 2001, and to U.S. application Ser. No. 09/870,478 (BW 03797.00131), filed Jun. 1, 2001, entitled "Information Storage Using Tables and Scope Indices", each of whose contents is expressly incorporated herein by reference as to their entireties.

FIELD OF THE INVENTION

Aspects of the present invention are directed generally to apparatus and methods for controlling a graphical user interface (GUI). More particularly, aspects of the present invention relate to capturing and/or storing electronic ink in an efficient manner.

BACKGROUND OF THE INVENTION

Typical computer systems, especially computer systems using graphical user interface (GUI) systems such as Microsoft WINDOWS, are optimized for accepting user input from one or more discrete input devices such as a keyboard for entering text, and a pointing device such as a mouse with one or more buttons for driving the user interface. The ubiquitous keyboard and mouse interface provides for fast creation and modification of documents, spreadsheets, database fields, drawings, photos and the like. However, there is a significant gap in the flexibility provided by the keyboard and mouse interface as compared with the non-computer (i.e., standard) pen and paper. With the standard pen and paper, a user edits a document, writes notes in a margin, and draws pictures and other shapes and the like. In some instances, a user may prefer to use a pen to mark-up a document rather than review the document on-screen because of the ability to freely make notes outside of the confines of the keyboard and mouse interface.

Some computer systems permit a user to draw on a screen. For example, the Microsoft READER application permits one to add electronic ink (also referred to herein as "ink") to a document. The system stores the ink and provides it to a user when requested. Other applications (for example, drawing applications as known in the art are associated with the Palm 3.x and 4.x and PocketPC operating systems) permit the capture and storage of drawings. These drawings include other properties associated with the ink strokes used to make up the drawings. For instance, line width and color may be stored with the ink. One goal of these systems is to replicate the look and feel of physical ink being applied to a piece of paper. However, physical ink on paper may have significant amounts of information not captured by the electronic collection of a coordinates and connecting line segments. Some of this information may include the thickness of the pen tip used (as seen through the width of the physical ink), the shape of the pen tip, the speed at which the ink was deposited, and the like.

Another problem has arisen in the storage of ink. The fact that ink may be created from number of different platforms (for example, from interactions between a stylus and a digitizer, from a mouse and the like) yields a variety of ink sizes (based at least in part on the resolution and sampling frequency of the digitizer or ink input system). To reduce the size of created ink with its variety of data points, one technique includes normalizing the size of the ink from the coordinate system in which it has been captured (referred to herein as the ink's native coordinates) to a different coordinate system. This normalization may have devastating effects on the ability of a handwriting recognition system to recognize and appropriately treat ink. For instance, FIG. 12A shows ink with 30 data points in its native coordinates (labeled A–AD). A handwriting recognition system may recognize the ink to spell out the word "ball." The data points may be represented by the following table:

| Point | X  | Y  |
|-------|----|----|
| A     | 2  | 2  |
| B     | 4  | 3  |
| C     | 5  | 4  |
| D     | 6  | 6  |
| E     | 6  | 10 |
| F     | 5  | 12 |
| G     | 4  | 8  |
| H     | 4  | 4  |
| I     | 5  | 2  |
| J     | 7  | 4  |
| K     | 6  | 4  |
| L     | 7  | 4  |
| M     | 9  | 4  |
| N     | 10 | 4  |
| O     | 9  | 2  |
| P     | 10 | 1  |
| Q     | 11 | 4  |
| R     | 12 | 2  |
| S     | 14 | 4  |
| T     | 14 | 7  |
| U     | 13 | 9  |
| V     | 13 | 5  |
| W     | 14 | 2  |
| X     | 15 | 2  |
| Y     | 17 | 5  |
| Z     | 18 | 7  |
| AA    | 16 | 9  |
| AB    | 16 | 4  |
| AC    | 17 | 2  |
| AD    | 19 | 2  |

However, the device or system that captured the ink of FIG. 12A may need to decrease the size of the captured ink or may need to scale down the ink so as to be used properly by an application. An example of this decrease in size or scaling may be to divide all data points by 4. In a binary representation, this means that the least significant bit and the second least significant bit are eliminated. One may, for example, use the following table to show a binary division by 4.

| Number | Binary | Binary /4 | Number /4 |
|--------|--------|-----------|-----------|
| 1      | 1      | 0         | 0         |
| 2      | 10     | 0         | 0         |
| 3      | 11     | 0         | 0         |
| 4      | 100    | 1         | 1         |
| 5      | 101    | 1         | 1         |
| 6      | 110    | 1         | 1         |
| 7      | 111    | 1         | 1         |
| 8      | 1000   | 10        | 2         |
| 9      | 1001   | 10        | 2         |

-continued

| Number | Binary | Binary /4 | Number /4 |
|---|---|---|---|
| 10 | 1010 | 10 | 2 |
| 11 | 1011 | 10 | 2 |
| 12 | 1100 | 11 | 3 |
| 13 | 1101 | 11 | 3 |
| 14 | 1110 | 11 | 3 |
| 15 | 1111 | 11 | 3 |
| 16 | 10000 | 100 | 4 |
| 17 | 10001 | 100 | 4 |
| 18 | 10010 | 100 | 4 |
| 19 | 10011 | 100 | 4 |
| 20 | 10100 | 101 | 5 |

Application of this process results in the quantization of the ink. Other quantizations or roundings are possible.

The original set of coordinates when divided by 4 is as follows:

| Point | X | Y |
|---|---|---|
| A | 0 | 0 |
| B | 1 | 0 |
| C | 1 | 1 |
| D | 1 | 1 |
| E | 1 | 2 |
| F | 1 | 3 |
| G | 1 | 2 |
| H | 1 | 1 |
| I | 1 | 0 |
| J | 1 | 1 |
| K | 1 | 1 |
| L | 1 | 1 |
| M | 2 | 1 |
| N | 2 | 1 |
| O | 2 | 0 |
| P | 2 | 0 |
| Q | 2 | 1 |
| R | 3 | 0 |
| S | 3 | 1 |
| T | 3 | 1 |
| U | 3 | 2 |
| V | 3 | 1 |
| W | 3 | 0 |
| X | 3 | 0 |
| Y | 4 | 1 |
| Z | 4 | 1 |
| AA | 4 | 2 |
| AB | 4 | 1 |
| AC | 4 | 0 |
| AD | 4 | 0 |

FIG. 12B shows the resulting sets of data points. Here, a handwriting recognition system would likely interpret the ink of FIG. 12B as "lill" or "lell" or the like, far from the original ink meaning of "ball." It is noted that any loops in the rendered ink are due primarily to curve fitting algorithms in the present rendition of FIG. 12B. It is equally as likely that a tighter fitting curve-fitting algorithm would reduce the loops in FIG. 12B, thus making the ink even more meaningless and/or less recognizable. In short, attempting to work from transformed ink may yield poor results.

A further problem is shown in FIG. 13. Ink captured on one environment may be distorted when displayed, rendered, or printed, in another environment. In general, tablets capture in a first coordinate system and covert the ink to a second coordinate system. This process is generally handled by the capturing system (for example, a digitizer tablet) itself. An application using the ink received from the tablet only sees the ink in relation to the second coordinate system. If the application (for example, a word processing program) receives ink from a number of different tablets, the possibility exists that the second coordinate systems may be incompatible. FIG. 13 shows a possible incompatibility among captured ink. Specifically, FIG. 13 includes a first tablet 1301 with a capture resolution of 800×400. Other tablets 1302, 1303, and 1304 are shown with different resolutions of 200×200, 400×400 and 1000×1000, respectively. In each tablet context, the word "hi" was written. Despite the standard size of the word "hi" in all tablet contexts, the outputs of each tablet results in the ink having a different size. The comparative sizes of the ink from the tablets 1301–1304 are shown in output 1305. Here, the transformation that was applied to each ink is as follows:

1) The output of tablet 1301 was divided by 2;
2) The output of tablet 1302 was multiplied by 2;
3) The output of tablet 1303 was not modified (or modified by a factor of 1); and,
4) The output of tablet 1304 was not modified (or modified by a factor of 1).

The ink from tablet 1304 has kept the same coordinate system yet the ink is so large that it dwarfs the other ink in output 1305, despite the fact that the ink of tablet 1304 was originally created with the same size drawing on the tablet 1304.

Yet another problem with handling ink occurs in compression of the ink after scaling. FIG. 14A shows the statistical distribution of sample ink before scaling (0, 1, −1, 2, −2, 3, −3, . . . ). FIG. 14B shows the ink when the ink has been scaled by multiplying the ink coordinates by a factor of 2 (0, 2, −2, 4, −4, 6, −6, . . . ). Here, the information contained within the ink of FIGS. 14A and 14B has not significantly changed. However, compressing the ink has become more difficult as larger numbers are used to represent the ink coordinates. FIG. 14C shows a more complex example of scaling ink. Here, the original ink of 14A was multiplied by a factor of 1.5. Alternatively, the ink of FIG. 14B was multiplied by a factor of 0.75. The resulting distribution of ink has become more complex as seen by the side lobes surrounding each primary peak (0, 1.5, −1.5, 3.0, −3.0, 4.5, −4.5, . . . ). The information contained within the ink has not significantly changed. However, the data used to convey the information contained within the ink has become more complex. In one example, the complexity may have increased due to the increase in distribution of the second derivatives of coordinate values (also referred to as a delta-delta distribution). Compression of the ink has become more complex as the number of different peaks of information has increased. In short, scaling of the ink may have detrimental effects on the compressibility of the ink.

Accordingly, an improved system is needed for storing information with its associated properties that minimize the size of the data used to represent the desired information.

SUMMARY OF THE INVENTION

The present invention provides a flexible and efficient system, method, and data structure for receiving, storing, and rendering electronic ink.

Aspects of the present invention are directed to an improved system, method and data structure for storing ink in a first coordinate system and a mapping to a second coordinate system. In some embodiments, the ink coordinates and the mapping (also referred to as a transform table) are stored together in an ink object. In further embodiments, the ink coordinates and mapping are stored in an ink object in a serialized format so as to minimize the size of the ink object. In yet other embodiments, the mappings may be combined to minimize degradation or loss of resolution of the ink (caused in some instances by rounding errors). Finally, some embodiments relate to defining and using a virtual ink space as the second coordinate system.

These and other features and aspects of the invention will be apparent upon consideration of the following detailed description of the preferred embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 6 and 7 show processes for transforming ink in accordance with embodiments of the present invention.

FIG. 8 shows a process for capturing ink in accordance with the present invention.

FIGS. 9 and 10 show various data structures for storing ink and associated properties in accordance with embodiments of the present invention.

FIG. 13 shows ink from various capturing environments.

DETAILED DESCRIPTION OF PREFERRED EMBODIMENTS

Figure 1:
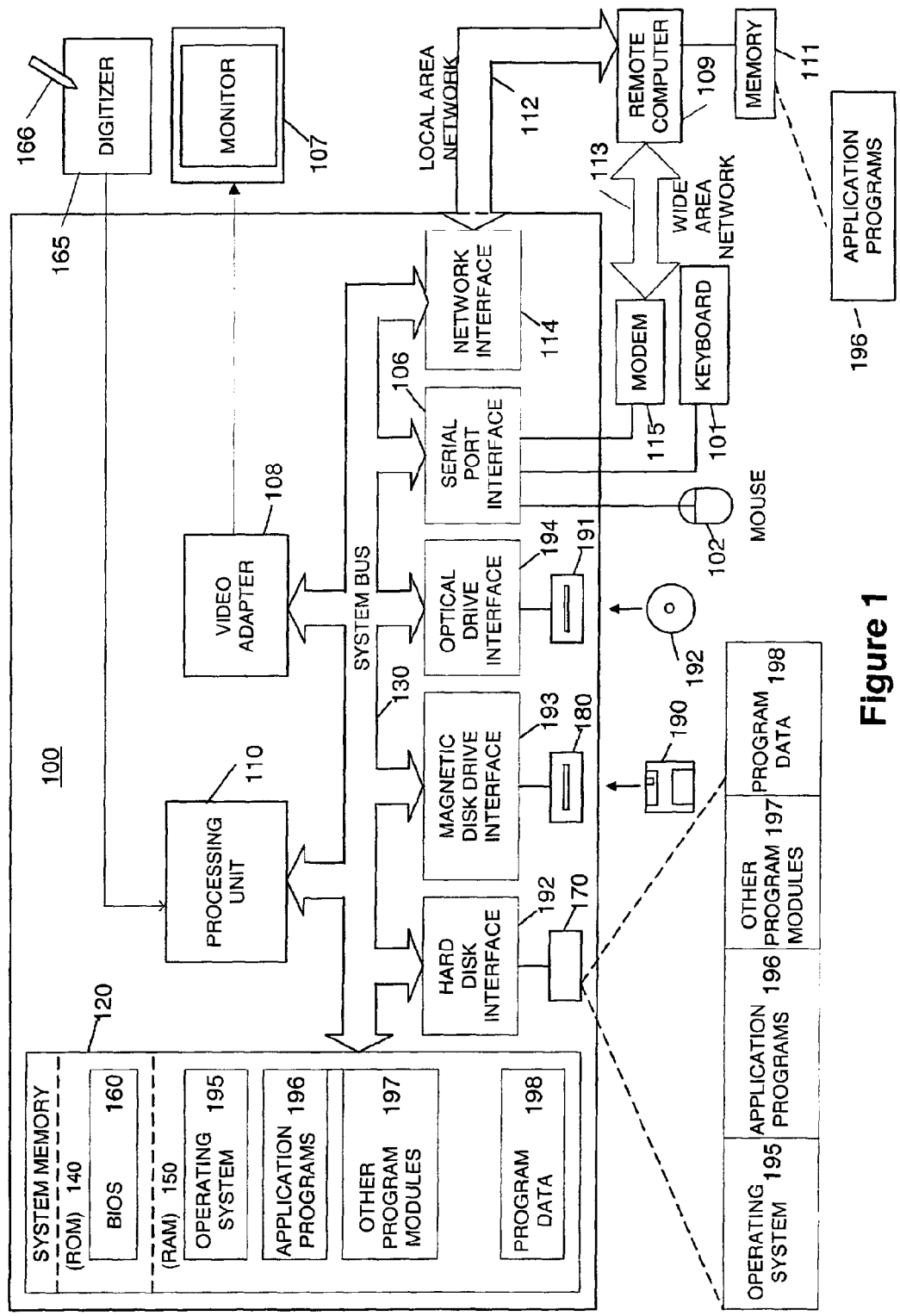
FIG. 1 shows a schematic diagram of a general-purpose digital computing environment that can be used to implement various aspects of the invention.

The following description is divided into sub-sections to assist the reader. The sub-sections include: characteristics and storage of ink; terms; general-purpose computer and associated hardware; an example of strokes of ink; transforming ink; data structures for storing ink and transform mappings; transform properties; encoding of values; and a summarization of the storage of ink.

While described with respect to the storage of ink, it is appreciated that the storage structures defined herein may be applied to non-ink items as well. For the purposes of this disclosure, ink objects are used as an example. Other objects reflecting information having properties may equally be used as well but are omitted for simplicity. For example, the storage structures may be applied to text (with properties including bold, font face, underline, margin settings and the like), graphics (with properties including modifications), non-modifiable information with subsequent modifications (for example, non-modifiable images with properties comprising subsequent comments), displayed information, and the like. The transform aspects described herein may be applied to the various objects and are considered within the scope of the present invention.

Characteristics and Storage of Ink

The present invention supports the storage of electronic ink and/or properties or other data associated with electronic ink. Ink as used herein refers to electronic ink. Ink refers to a sequence of strokes, where each stroke is comprised of a sequence of points. The points may be represented using a variety of known techniques including Cartesian coordinates (X, Y), polar coordinates (r, Θ), and other techniques as known in the art.

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve).

To provide the look and feel of physical ink, the exemplary disclosed system and method store ink strokes and properties associated with the ink strokes to more fully render ink. In some embodiments, ink may be stored as a series or set of strokes and a series or set of properties. In other embodiments, ink may be stored with a complex series of properties in which the properties have properties of their own. Properties of the ink may include, for example, color, width, pressure between the stylus and tablet, and angle between the stylus and tablet, and pen shape and the like. While these properties may suffice for many applications, embodiments of the present invention provide for the extensible storage of custom properties (and other data) generated by applications. All strokes and values may be stored directly with excess information. However, alternative embodiments reflect considerations that eliminate excess information when possible or practicable.

One of these properties may include a mapping of a coordinate system to another. For example, ink may be stored in its original coordinate system. The ink may be associated with a transform mapping from the original coordinate system to another coordinate system. In further embodiments, the mapping may be altered to reflect the application of the ink to further coordinate systems.

As a part of the ink object, a transform mapping may be stored to represent the transform of the ink in its native coordinates to a virtual ink space. At a later time, the mapping may be used to transform the ink. In further embodiments, a second transform that maps coordinates from the virtual ink space to an output (for example, a printer, display, graphical file, handwriting recognition system, and the like) may be combined with the original mapping to the virtual ink space. The combination of the mappings may be applied to the ink in its native coordinates to directly transform the ink into a final coordinate system. It is appreciated that further combinations of mappings are realizable as well.

Terms

Ink—A sequence or set of strokes with properties. A sequence of strokes may include strokes in an ordered form. The sequence may be ordered by the time captured or by where the strokes appear on a page. Other orders are possible. A set of strokes may includes sequences of strokes or unordered strokes or any combination thereof Stream—A sequence of strokes that may or may not include properties that comprises a data structure.

Ink object—A data structure storing a stream with or without properties.

Stroke—A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point—Information defining a location in space. For example, the points may be defined relative to a capturing space (for example, points on a digitizer), a virtual ink space (the coordinates in a space into which captured ink is placed), and/or display space (the points or pixels of a display device).

Space—A context in which objects have meaning. For example, a digitizer space may include the capturing of ink (or other information). A rendering space may refer to the context of determining how information is to be rendered. A virtual ink space may be considered to exist between the digitizer space and the rendering space.

Virtual Ink Space—A framework to which all ink strokes relate. The framework may include a two- or three- (or more) dimensional shape. In one example, the framework may include a unit size square. In another example, the framework may include a defined rectangle, referred to as an ink space rectangle. While some ink strokes may extend outside of the framework, the framework may be used as a starting point for rendering purposes including dimensioning for a printer or a display or subsequent processing by, for example, a handwriting recognition system, or the like. In one aspect, the virtual ink space is a norm to which ink strokes may be spatially defined.

Ink Space Rectangle—a defined rectangle to which ink may be referenced. For example, when ink is captured, the mapping to the virtual ink space may include its relation to the ink space rectangle.

Transform Table and Transform Block—A mapping from one coordinate set to another coordinate set. The mapping may include equations, coefficients, from and to rectangles, or any combinations of these as well as others. The mapping may be provided by itself, in combination with an ink object, in combination with other mappings, or in combination with other mappings in an ink object. When used in combination with an ink object, the mapping may be specified in a transform block. When used with other transform blocks, the transform blocks may be combined into a transform table.

Global Ink Properties—These are properties that apply to a stroke or set of strokes unless otherwise defined. For example, a selected ink color may be blue. By setting all strokes to blue, the default color of the strokes would be blue.

Local Ink Properties—These are properties that apply to a specific stroke (or data point or data points). For example, while a global ink property may be blue, a specific stroke may be set to red. Some local ink properties may be interpreted, in some cases, as global properties as they affect subsequently encountered strokes in an ink object. It is noted that properties may or may not be labeled as global or local. In some examples, the created data structure defines the scope of the properties.

Render—The process of determining how text, graphics, and/or ink is to be displayed, whether on a screen or printed, or output into another file format.

General Purpose Computer

FIG. 1 illustrates a schematic diagram of an exemplary conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107.

Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
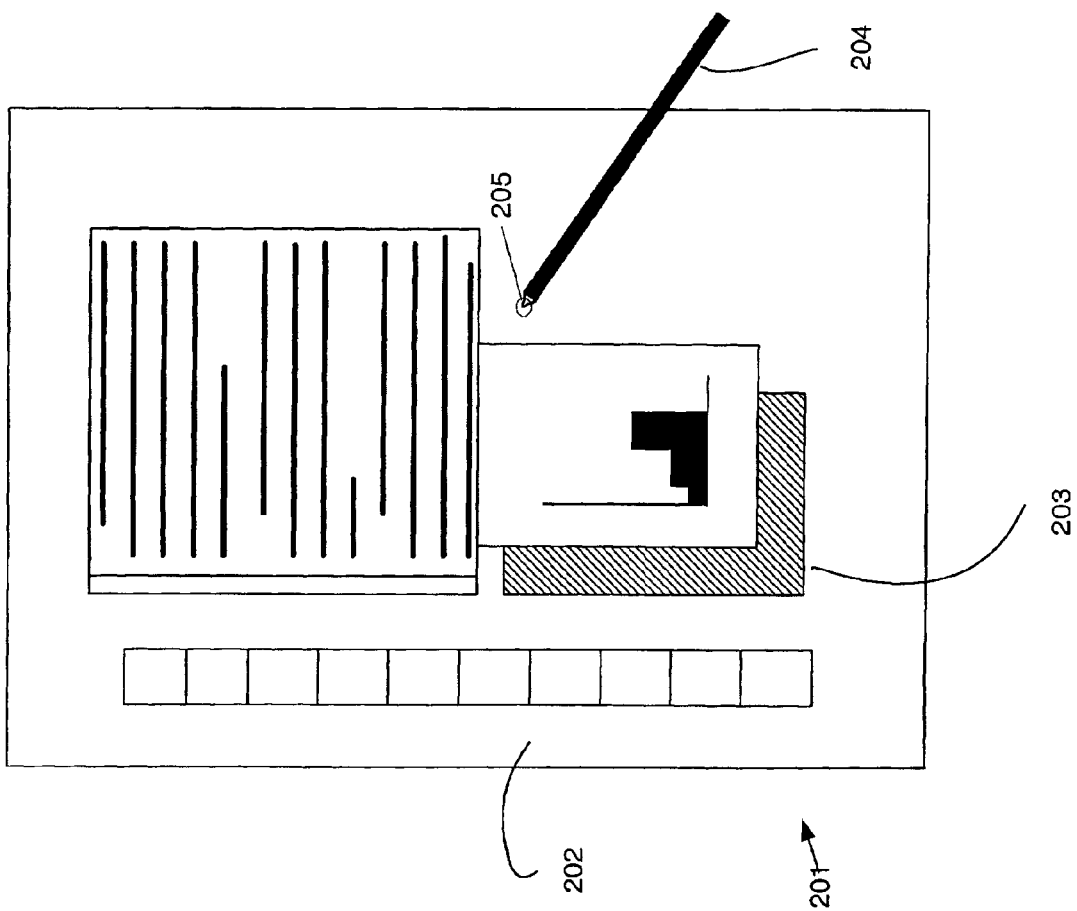
FIG. 2 shows a plan view of a tablet computer and stylus that can be used in accordance with various aspects of the present invention.

FIG. 2 illustrates an exemplary tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation.

An Example of Strokes of Ink

Figure 3:
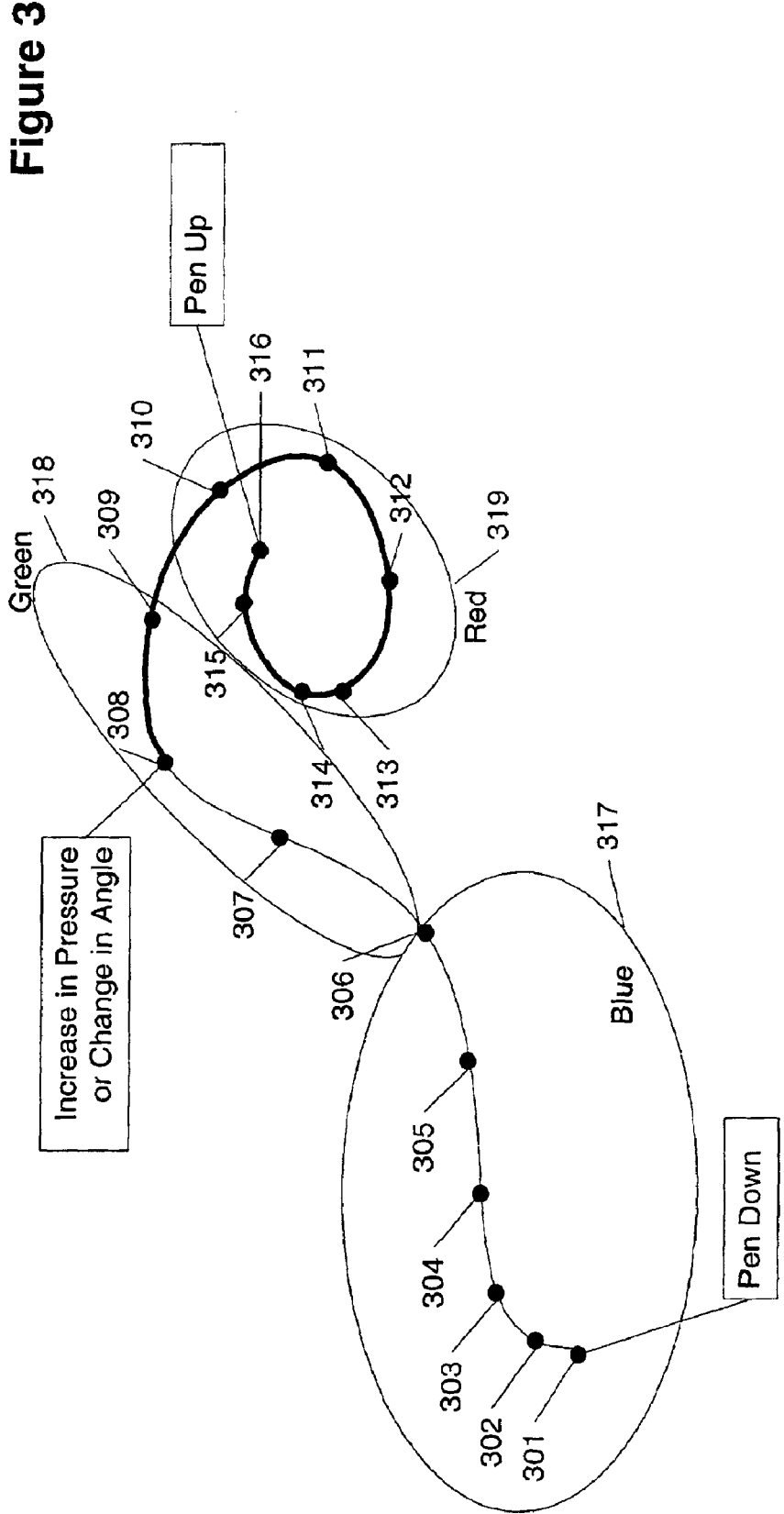
FIG. 3 shows an example of a stroke or strokes of ink having points and properties in accordance with the present invention.

An exemplary ink object is shown in FIG. 3. The ink object starts at point 301 where a pen down action occurred. The pen down action may be stylus 204 contacting the display surface 202, the click of a mouse button, the operation of a button on a trackball or joystick, or the like. The user controls an input (such as stylus 204) device and the resulting stroke continues through points 302–316. At point 316, a pen up action occurred. The pen up action may be the lifting of the stylus 204 off the display surface 204, releasing or another operation of a mouse button, or the operation of the button (or other buttons) on the trackball or joystick or the like. Here, a pen up action and a pen down action are known in the pen digitizing art.

From points 301 through 308, the width of the stroke has a first value. At point 308, the width of the stroke changes to a second value. This may have been because the user increased the pressure between the stylus 204 tip and the display surface 202, because the angle between the stylus 204 and the tablet changed, because the stylus 204 was rotated and projected a different cross section of the stylus 204's nib, or the like. The stroke then continues through point 316 with the second stroke width. In an alternate embodiment, a user started the stroke with a first line width and selected a different line width at point 308 to complete the stroke. In a further embodiment, two strokes may form the ink object as shown in FIG. 3. For example, a first stroke may include points 301–308 and a second stroke may include points 308–316.

In a further embodiment, the ink of FIG. 3 may be represented as four or more strokes. Here, the stroke or strokes from points 301 to 306 may be blue (represented by group 317) with the first stroke width, the stroke or strokes from points 306 to 308 may be green (group 318) with the first stroke width, the stroke or strokes from points 308 to 309 may be green (also as part of group 318) with the second stroke width, and strokes or strokes from points 309 to 316 may be red (group 319) with the second stroke width.

Next, the ink object may be stored (or transmitted or displayed or the like). The ink object stroke may be represented as a single stroke with varying line widths and colors. Alternatively, the ink object may be stored as a variety of strokes having a few data points in which each stroke has its own set of properties. Third, the ink object may be stored as short strokes between points. In short, the ink object may represent a stroke in a variety of forms.

Transforming Ink

Ink objects may be created with a number of different input sources. The input sources may include a variety of tablets with different tablet resolutions. The different tablet resolutions may result in ink drawn on a screen be rendered incorrectly when the created ink is ported to and displayed on a tablet having a different resolution or screen size. To adjust the ink to a common size, a set of transform properties (or transforms) may be stored to indicate how the ink object is to be adjusted to a common space.

As described above, ink may be captured in a variety of ways. The ink may be transformed larger or smaller, rotated, translated, warped, and the like. Along these lines, ink may need to be transformed from its native coordinate system to a different coordinate system. For example, a tablet may capture ink in a first resolution, transform the ink to a second resolution, and output the ink in the second resolution to an application.

Figure 4:
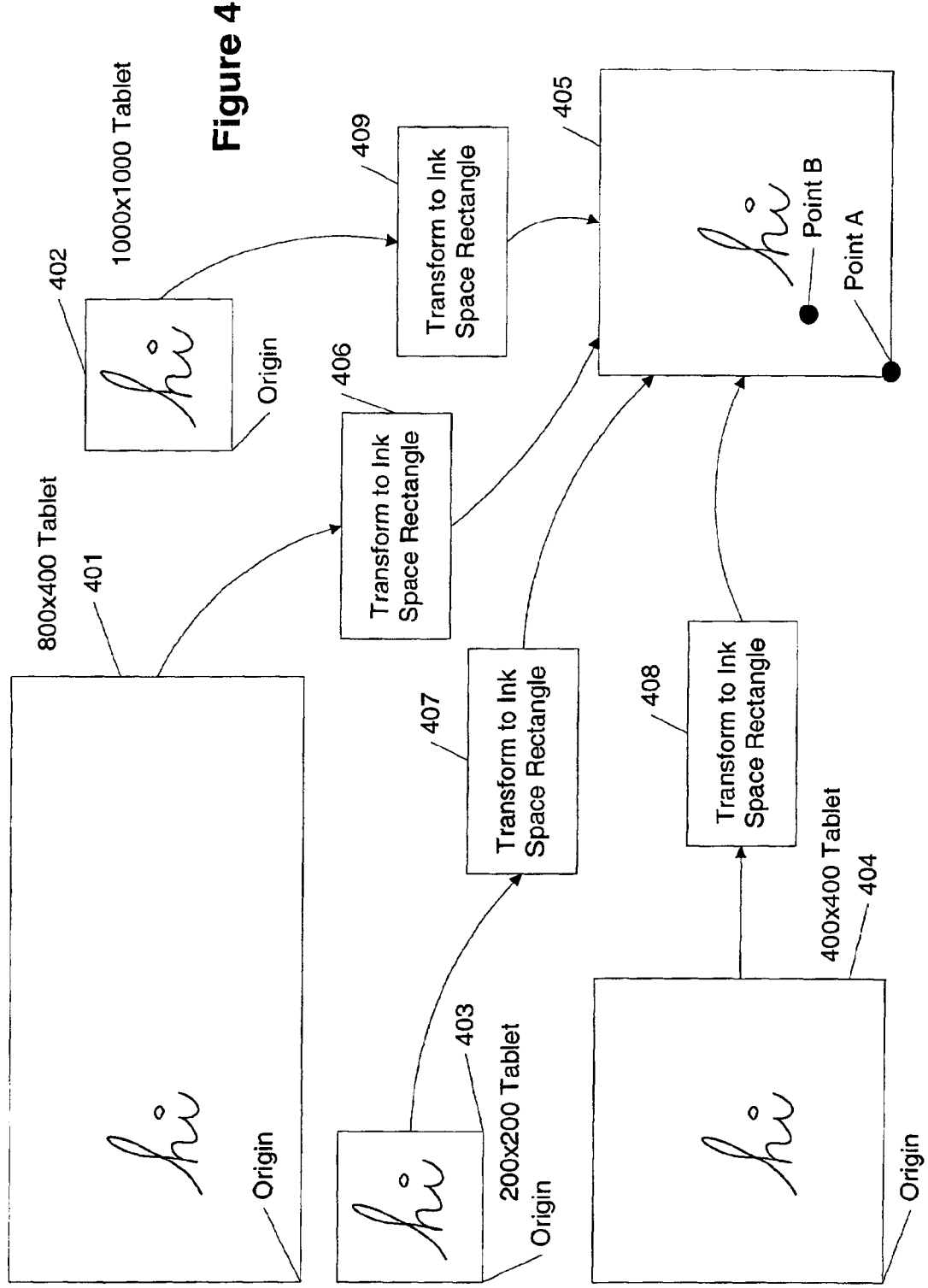
FIG. 4 shows ink from various platforms transformed in accordance with embodiments of the present invention.

FIG. 4 shows ink from various platforms in their respective native coordinates transformed to a second coordinate system relating to a virtual ink space. Table 401 has a resolution of 800×400 points for capturing ink. Tablets 402, 403, and 404 have resolutions of 1000×1000, 200×200, and 400×400, respectively. Ink captured on these tablets includes a property that relates them to the virtual ink space. In this example, the virtual ink space is shown as a 400×400 resolution rectangle 405. The virtual ink space is not limiting. Rather, ink may extend beyond the sides of rectangle 405 specified above. Along this line, the virtual ink space may be used as an initial framework to permit an application to appreciate an intended size of the ink and relationships between ink.

Blocks 406, 407, 407, and 409 represent transformation from the initial coordinate sets of tablets 401, 403, 404, and 402, respectively, to the virtual ink space. The ratio for mapping tablet 401 to the virtual ink space by the transform 406 may be 1:1 for both the X and Y directions with the origin of tablet 401 placed at the at point A in virtual ink space 405. Note that points in the X direction from the tablet 401 exceed the length of the rectangle 405. The ratio for mapping tablet 403 to the virtual ink space by the transform 407 may be 1:1 for both the X and Y directions with the origin of tablet 403 placed at the at point B in rectangle 405. The ratio for mapping tablet 404 to the virtual ink space by the transform 408 may be 1:1 for both the X and Y directions with the origin of tablet 404 placed at the at point A in rectangle 405. The ratio for mapping tablet 402 to the virtual ink space by the transform 409 may be 1000:400 (or 1000/400:1 or 5:2 or 5/2:1) for both the X and Y directions with the origin of tablet 402 placed at the at point B in rectangle 405.

Figure 5:
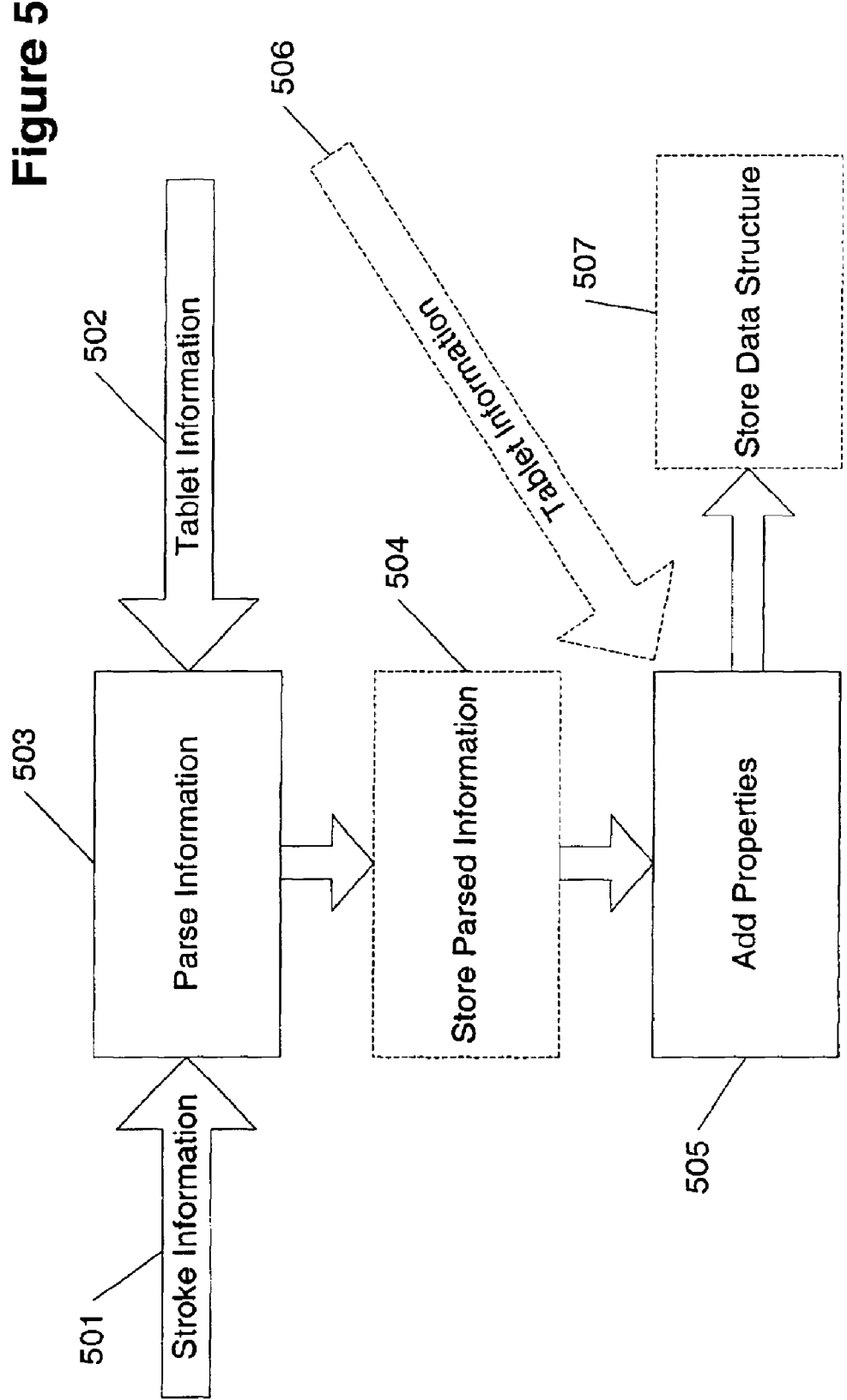
FIG. 5 shows a process for creating a data structure having a transform in accordance with embodiments of the present invention.

FIG. 5 shows an exemplary process for creating a data structure having a transform. First, in step 501, stroke information is received. This information may come from a display surface 202 or any other source that is capable of generating strokes. Next, in step 502, the system 201 parses the stroke information 501. The system may parse a number of items including, for example, pressure information, stylus 204 tilt information, position information and the like. The parsed information may be temporarily stored in step 504 (as shown as an option by the dotted box of 504) and properties added in step 505 (for example, global and/or local properties).

Tablet information 502 may be obtained and parsed in step 503. Alternatively, tablet information 502 may be obtained and added as a transform mapping property in step 505. Next, in step 507, the data structure is stored. Here, the storage step 507 is considered optional as other things may occur to the created ink object including, but not limited to, the inclusion of additional transformations in the ink object. Alternatively, the data structure may be forwarded to another device, displayed, further manipulated, and the like. Co-pending U.S. Ser. Nos. 09/852,799 (BW 03797.00132) and U.S. Ser. No. 09/870,478 disclose various tagged structures, which are incorporated by reference.

FIGS. 6 and 7 show processes for transforming ink. FIG. 6 shows multiple transforms of original ink 601 resulting in ink C 607. Original ink 601 its original coordinate 601 is transformed (with a first transform 1 602) to ink A 603. Ink A 603 is transformed (with a second transform 2 604) to ink B 605. Finally, ink B 605 is transformed with transform 3 606 to ink C 607.

FIG. 7 shows an alternative process for transforming original ink 701 into ink A 703, ink B, 705, and ink C 707. As with FIG. 6, original ink 701 may be transformed using transform 1 in step 702 to form ink A 703. In step 704, however, transform 1 and transform 2 may be combined and applied to original ink 701 to form ink B 705. Further, in step 706, transform 1 may be combined with transform 2 and transform 3 and then applied to the original ink 701 to form ink C 707. At least one advantage of combining transforms prior to application to ink is that transforming the ink once minimizes degradation of the ink and/or minimizes the complexity of the ink.

FIG. 8 show a process for creating and rendering ink. In step 801, the system receives an event indicating that the ink is about to be created. Here, this event is referred to as a "pen down" event. In step 802, the system creates an empty ink object for storing the created ink. In step 803, the system defines a mapping from the capturing device to a virtual ink space. Here, the mapping may include a set of equations, a listing of coordinates, and the like. Further, the definition of the tablet space to the virtual ink space may be the specification of the tablet and the specification of the virtual ink space. An example of combining transforms is shown in relation to equations 8–15 below.

Next, in step 804, a stroke is added to the ink object. In an alternative embodiment, strokes may be added as a group to the ink object. In step 805, the system determines whether an event has occurred that signals the end of the ink stroke. This event may be a "pen up" event or any other event that may indicate that no more strokes are to be added to the ink object. In an alternative embodiment, the ink object may have strokes added even after the pen up event or alternative event.

In step 806, a transform mapping may be applied to the strokes. For example, if a tablet has a high resolution and the ink object is not to store coordinates in such a high resolution, an initial transform may be applied to the stroke or strokes in the ink object in step 806.

In step 807, the ink object is finished. The finished ink object may be stored or otherwise handled. For example, the stroke or strokes may be transformed in step 808. Also, the ink object may be rendered in step 809. The steps 806, 808, and 809 are optional in this process as shown by their dotted boxes. Further, the definition 803 of the transform or transforms to be applied to ink strokes may be determined after the ink strokes have been added to the ink object.

Data Structures for Storing Ink and Transform Mappings

An ink object is one of a variety of structures for storing ink. FIG. 9 shows an embodiment of a data structure used for storing ink. Other data structures are shown in related U.S. application Ser. Nos. 09/852,799 (BW 03797.00132) and 09/870,478 (BW 03797.00131), which are expressly incorporated by reference. Ink object 900 with an ink object identifier 901 contains a property table 903 and five strokes (907, 909, 910, 912, and 913). The property table 903 (with property identifier or tag 902) includes property blocks 904, 905, and 906). The ink object 900 also contains two indices (an index 908 to property block 2 905 and an index 911 to property block 1 904). The two indices are located between strokes 1 907 and 2 909 and between strokes 3 910 and 4

912, respectively. Stroke 1 907 does not have a preceding index. In one example, stroke 1 907 may have properties specified by a default property block (not shown). In another example, stroke 1 907 may have an implicit index to the first property block (here, property block 1 904). In a third example, stroke 1 907 may not appear (rather, pushed down in the data structure to appear after at least one index) as shown by the dotted box of stroke 1 907).

When more than one property block occurs, it may be stored with other property blocks in a property table. The specific property blocks may be specified by an index referencing a specific property block or a default property block. Strokes 3 910 and 5 913 do not have immediately preceding indices. In one example, this may indicate that strokes 3 910 and 5 913 are to have properties specified by the default property block (not shows). In an alternate example, the strokes 3 910 and 5 913 use the most recent preceding index. Stroke 3 910 would use index 908. Stroke 5 913 would use index 911. Eliminating the recitation of an index for strokes 3 910 and 5 913 helps reduce the size of the ink object by the space that would have been consumed by separate indices for strokes 3 910 and 5 913.

Figure 10:
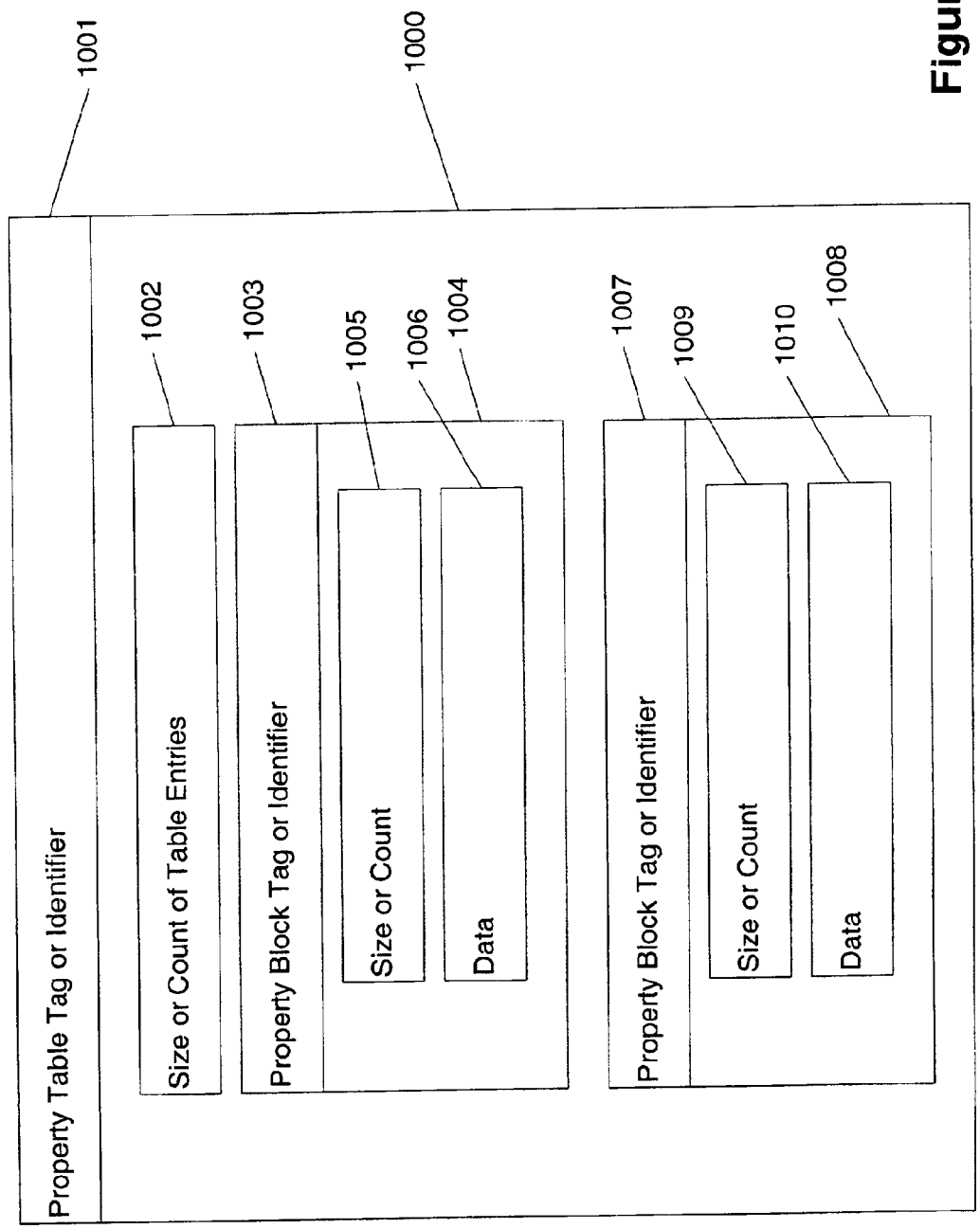

FIG. 10 shows an embodiment of a property table 1000. The table 1000 includes a property table tag or identifier 1001. Following identifier 1001 is the size or count of the number of table entries 1002. The table 1000 contains property block 1004 with identifier 1003 and size or count information 1005 followed by the data for the property block 1006. Also contained in the table 1000 is another property block 1008 with tag or identifier 1007 with size or count information 1009 followed by the data for the property block 1010.

Here, the identifier 1001 is generally referred to as a tag (or TAG or Tag). A "tagged" structure, as shown in FIG. 10, begins with an identifying "tag" followed by a "size field" followed by data. The "tag" identifies the contents of the data while the "size field" identifies, for example, the size of the data in bytes (or bits and the like). The tag may be either a predefined tag or an application-specific custom tag. In alternate embodiments, the size of the tagged field may appear prior to the tag itself.

The structure as shown in FIG. 10 may also include a count of the number of objects, tags, properties, strokes, and the like contained within it. In this regard, the "count" identifier may be used in place of the "size" identifier. If one specifies the size of the rest of the data of the tag, a system may then quickly skip over the rest of the data of the tag if desired. On the other hand, if the count of the number of objects (or properties or the like) was specified, the physical size of the count would likely be smaller than the physical size of the remaining data. In this regard, the ink object would be smaller if a count of remaining objects (or the like) was used rather than a size of the remaining data. However, to skip over the remaining part of an ink object or property, one may need to enumerate all of the sub-objects (or sub-tags or sub-properties) contained within the object or tag. To enumerate these sub-parts, a system may need to perform additional calculations to obtain the number of sub-parts. Further, a system may need to perform additional steps on the skipping operation (for example, advancing past the present object or tag or property) by counting the sub-parts in a count-based data structure, rather than advancing to a new position as used in a size-based system.

One benefit of placing the size after the tag itself is that applications that do not recognize the tag may know, by reading the next portion of information (the size block 1002, 1005, 1009), the length of data needed to skip over to arrive at the next tag or end of the ink data structure.

As to the specification of size of following data or the count of items in following data, it is appreciated that one may use either of the two ways of specifying information. For simplicity, the following description includes the use of size information. In some instances, count information is also shown. However, where only size information is shown, count information may readily be specified in place of or in addition to the size information.

As applied to ink, the tagged data structure of FIG. 10 may be enhanced in a number of ways. In some embodiments, ink strokes may be defined to come in order. In other embodiments, global properties (or properties that may affect all subsequent ink strokes) are provided at a known location for the system. For example, all global properties may be specified at the beginning of the ink object. On the other hand, all global properties may be specified at the end of the ink object. One advantage of putting the global properties at the beginning of the ink object is that a system would already know how to handle a stroke that referenced global properties once it encounters the stroke (as it would have already encountered the global properties section of the ink object). In yet more embodiments, custom properties may be defined through various tables. The use at least one of these or other enhancements permit properties to be used throughout the ink object and permit a more efficient storage of ink information.

The "tag" describing the "data" indicates whether the "data" contains tagged structures or even how many tagged structures. For example, custom properties are considered opaque to the present system since they are application-defined and thus only contain data. However, a stroke may have one or more stroke properties, which are also represented as tagged structures.

Ink properties may be defined to minimize or eliminate redundant information. In simple streams, there may be no ink properties. However, if there are ink properties, then it is preferable that they appear before any strokes so that they may apply to all strokes when needed. It is appreciated that the properties may be placed after the strokes as well. A number of global properties may be used. More or less global properties may be defined and used as needed.

With respect to ink objects, common properties appear. The properties may be grouped into transformation properties, drawing attributes properties, metrics properties, and stroke description properties. Other properties may be defined and used as well. Also, not all (if any) of the specific above-identified properties are required to practice the invention. Sample implementations of the above common properties are shown. Other properties are addressed in greater detail in co-pending U.S. Ser. No. 09/852,799 (BW 03797.00132) and U.S. Ser. No. 09/870,478 (BW 03797.00131), which are incorporated by reference.

Transform Properties

Figure 11:
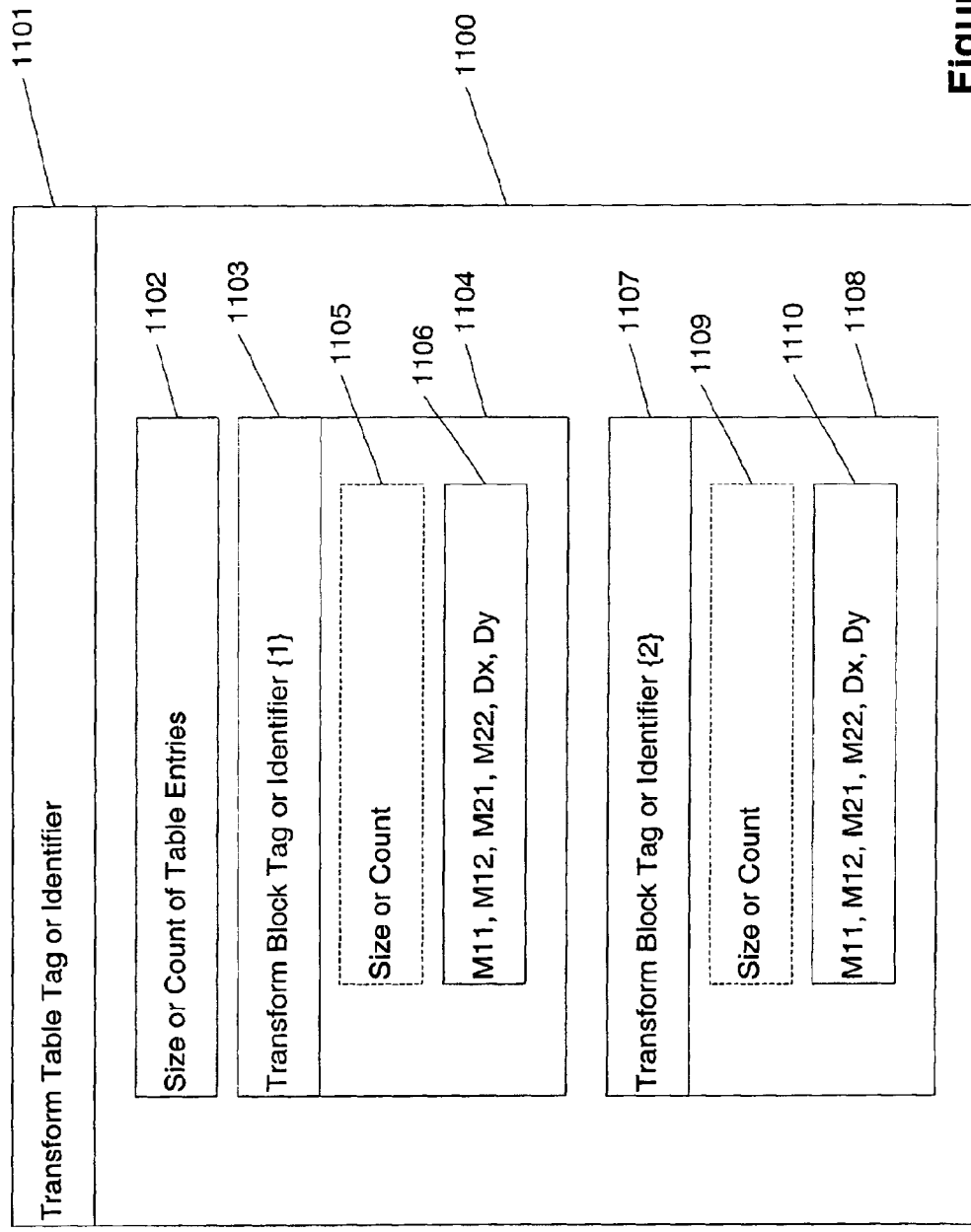
FIG. 11 shows a data structure storing a transform table and transform blocks in accordance with embodiments of the present invention.
Figure 12A:
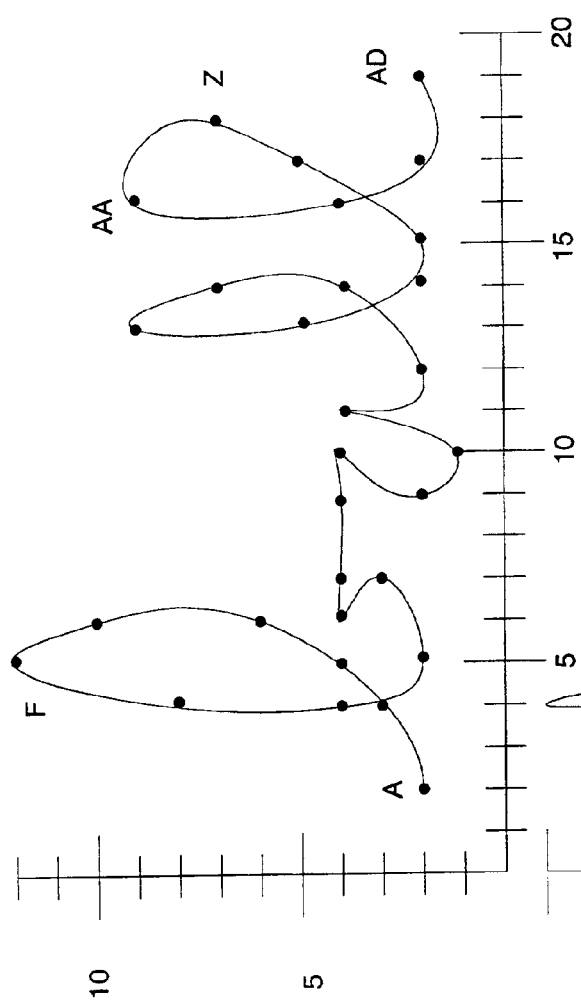
FIGS. 12A and 12B show ink before and after resizing.
Figure 12B:
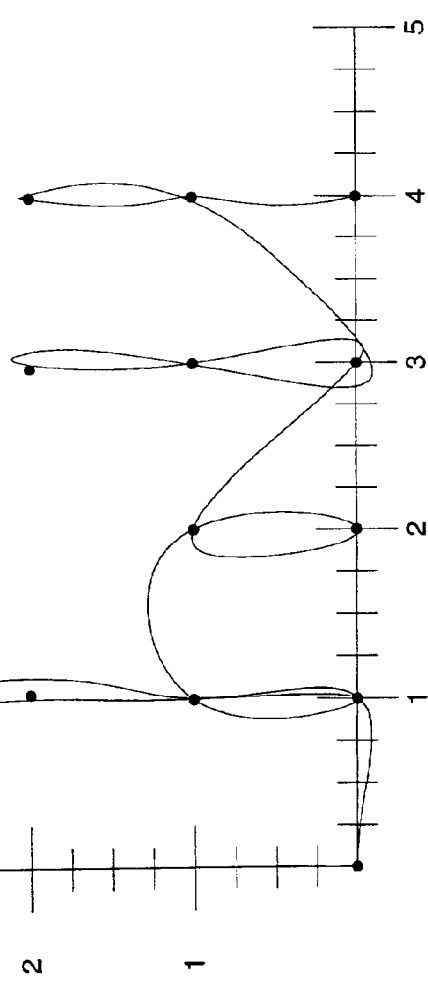
Figure 14A:
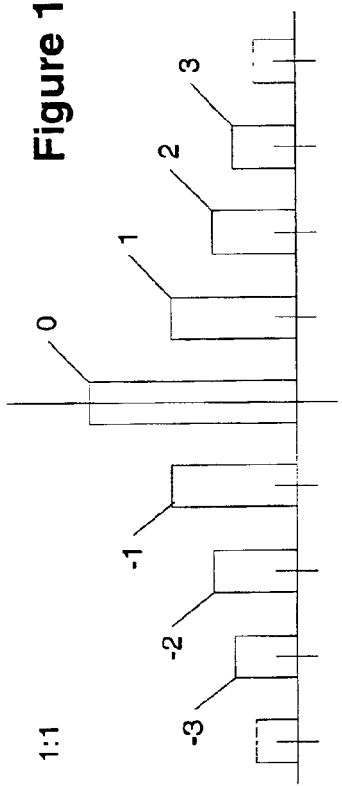
FIGS. 14A–14C show statistical distributions of ink before and after resizing.
Figure 14B:
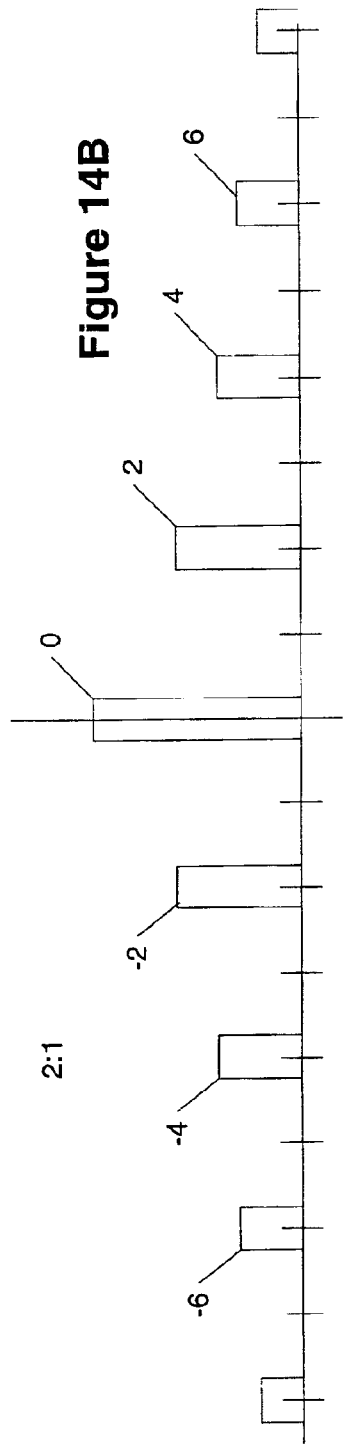
Figure 14C:
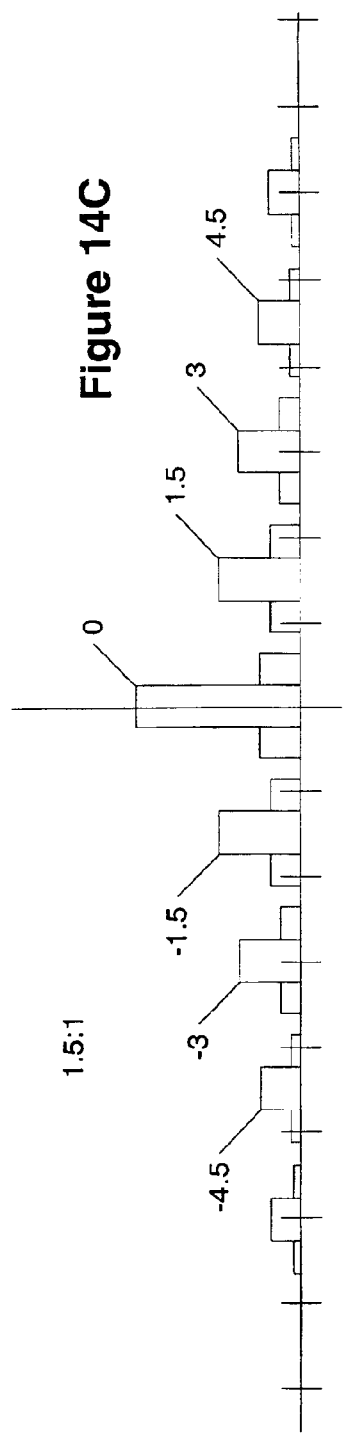

FIG. 11 shows a transform table 1100 as including transform blocks 1104 and 1108 that represent the various transform properties that may be used by an ink stream. Each transform block 1104, 1108 may define a unique transform that is applied to the ink points before they are rendered or used. These blocks 1104, 1108 may apply to one or more strokes and are placed in table 1100 so that they are not repeated in each stroke.

One may use the identifier of TAG_TRANSFORM_TABLE as the identifier 1101 to identify the transform table 1100. The size or count of the table may follow 1102. The size of the table may be is equal to the sum of the sizes of all transform blocks. The count may be equal to the number of blocks 1104, 1108 in the transform table 1100. Each transform block 1104, 1108 may include a transform block identifier 1103, 1107, a size or count field 1105, 1109 and a data field 1106, 1110.

To transform a point (X, Y) in two dimensions to a new point (X', Y'), one may use the following two equations:

$$X' = xM11 + y\,M12 + Dx \tag{1}$$

$$Y' = xM21 + yM22 + Dy \tag{2}$$

The two equations provide a general solution in two dimensions for both rotation and translation of a point or points as based on the transformation matrix of six coefficients, namely M11, M12, M21, M22, and Dx and Dy (M11, M12, M21, and M22 being the rotational and scalar coefficients and Dx and Dy being the translational coefficients. A matrix of the six coefficients may take the form of M11 M12 Dx M21 M22 Dy A general equation for three dimensions may be given by:

$$X' = xM11 + y\,M12 + zM13 + Dx \tag{3}$$

$$Y' = xM21 + yM22 + zM23 + Dy \tag{4}$$

$$Z' = xM31 + yM32 + zM33 + Dz \tag{5}$$

A specific solution without rotation for two dimensions may be given by:

$$X' = xM11 + Dx \tag{6}$$

$$Y' = yM22 + Dy \tag{7}$$

The following description relates to transforms in two dimensions. It is appreciated that any n-dimension transforms may be used.

The specification of the six coefficients for the transform properties of equations 1 and 2 may be preferable to only specifying the four coefficients of equations 6 and 7 due to the fact that tablets (and/or capture systems may orient captured ink differently, for example, the origin being at the top left corner of a screen as opposed to the bottom left of a screen). On the other hand, specifying only four coefficients takes less space.

In one example, if the size of the four or six coefficients is constant (as opposed to the actual values of the coefficients), the size or count fields 1105, 1109 may be eliminated. Further, a transform table containing only one transform block is a special case. As with other properties in which there is only one block, the table tag 1101 and size/count 1102 for the table may be omitted and the entire table may be replaced by a single transform block.

In the simplest case, where the capturing environment and the rendering environment have no transformations between them, as well as in cases where scaling and transforms have been applied outside of a native capture environment, no transform tables may be created.

To assist in the transformation to a common coordinate space, an ink space rectangle that defines a virtual coordinate space (or virtual ink space) for receiving ink may be specified. One tag that may be used includes TAG_INK_SPACE_RECT, which identifies the ink space rectangle when present in the stream. This rectangle may be, for example, rectangle 405 from FIG. 4. The entry for the rectangle may have a size field. On the other hand, the entry for the rectangle may not need a size field the rectangle has a fixed number of elements of, for example, four signed numbers. These four numbers represent the left, top, right, and bottom of the ink space. The ink space rectangle defines the virtual coordinate space for the ink. An application may use this rectangle to determine what area of the ink to either display or print. The ink space rectangle may be referred to as defining a virtual sheet of paper that the ink is drawn on. This does not mean that ink may not appear outside this area. However, the application may use this rectangle when deciding how to display the ink according to a given view or on the printer.

As described above in some embodiments, transforms may be combined prior to application to ink in a first coordinate system. The following is an example of how two two-dimensional mappings may be combined into a single mapping. It is appreciated that more mappings in N dimensions may be combined as well but are not shown for simplicity.

A first transformation mapping may be given by:

$$X' = ax + by + c \tag{8}$$

$$Y' = dx + ey + f \tag{9}$$

A second transformation mapping may be given by:

$$X'' = gx' + hy' + i \tag{10}$$

$$Y'' = jx' + ky' + m \tag{11}$$

These two mappings of equations may be expressed as:

$$X'' = g(ax+by+c) + h(dx+ey+f) + i \tag{12}$$

$$Y'' = j(ax+by+c) + k(dx+ey+f) + m \tag{13}$$

Equations 12 and 13 simplify to:

$$X'' = (ga+hd)x + (gb+he)y + gc + hf + i \tag{14}$$

$$Y'' = (ja+kd)x + (jb+ke)y + jc + kf + m \tag{15}$$

These equations may also be represented in matrix form with equations 8 and 9 as $$\begin{bmatrix} a & b & c \\ d & e & f \\ 0 & 0 & 1 \end{bmatrix} \begin{bmatrix} x \\ y \\ 1 \end{bmatrix}$$

Equations 10 and 11 as $$\begin{bmatrix} g & h & i \\ j & k & m \\ 0 & 0 & 1 \end{bmatrix} \begin{bmatrix} x' \\ y' \\ 1 \end{bmatrix}$$

and equations 14 and 15 as $$\begin{bmatrix} g & h & i \\ j & k & m \\ 0 & 0 & 1 \end{bmatrix} \cdot \begin{bmatrix} a & b & c \\ d & e & f \\ 0 & 0 & 1 \end{bmatrix} \begin{bmatrix} x \\ y \\ 1 \end{bmatrix} = \begin{bmatrix} ga+hd & gb+he & gc+hf+i \\ ja+kd & jb+ke & jc+kf+m \\ 0 & 0 & 1 \end{bmatrix} \begin{bmatrix} x \\ y \\ 1 \end{bmatrix}$$

Accordingly, having the coefficients for a first mapping and a second mapping may be combined. The resulting mapping may then be combined with other mappings or applied to ink to transform the ink.

A number of tags may be used to indicate the type of transform to be applied to ink. The following table provides a list of tags and information relating to the coefficients for the transform. The values having no value (or zero as a value) may have a placeholder in the matrix (e.g., 0) or the placeholder may be eliminated. Eliminating the placeholder further reduces the size of the data structure storing the ink.

| Tag | Coefficients |
| --- | --- |
| TAG_TRANSFORM_ISOTROPIC_SCALE | M11 = M22 nonzero value; M12 = M21 = DX = DY = 0 |
| TAG_TRANSFORM_ANISOTROPIC_SCALE | M11, M22 arbitrary non zero floats; M12 = M21 = DX = DY = 0 |
| TAG_TRANSFORM_ROTATE | Storing MBE integer number, 0–36000 // 1/100 of degree units |
| TAG_TRANSFORM_TRANSLATE | M11=M22=M12= M21=0; DX, DY arbitrary |
| TAG_TRANFROM_SCALE_AND_TRANSLATE | M11, M22, DX, DY arbitrary; M12=0,M21=0 |

Of course, other tags are possible that further define additional sets of transforms.

Transform Index

If only one transform is to be applied to all strokes in an ink object, then a transform block 1104 with identifier 1103, size/count field 1105, and coefficients 1106 may be specified. If more than one transform is specified in an ink object, the ink object may use an index to relate a stroke or series of strokes back to a specific transform (for example in a transform block). The transform index (which may be specified with the identifier TAG_TIDX) assigns a transform block to a stroke. A transform index may be followed by an index value that specifies the entry in the transform table. All strokes in the stream from that point on may use the specified transform block until the next transform index is encountered in the stream.

In an alternate embodiment, if there is no transform index in the stream somewhere before the stroke, it may be assumed that this stroke should use the 0th transform block in the transform table. And if there is no transform table in the stream, then no transforms should be applied to any stroke.

Encoding of Values

To further assist with the storage of ink, the content of an ink object may be serialized as described in U.S. Ser. Nos. 09/852,799 and 09/870,478, which are expressly incorporated by reference. Also, the X and Y data may be compressed. A number of encoding strategies and compression methods may be used alone or in combination.

Sizes of Tags and Numbers

At the most basic level, the ink object may be composed of numbers. Even tags may be considered indexes, which are just small integer numbers. In fact, most of the time these numbers are small enough that they could be represented by a single byte if there was a way of determining when a byte represented a single number and when it was just part of a bigger number. In some embodiments, no encoding is used. In other embodiments, it may be possible to take advantage of this observation by encoding numbers using a multi-byte encoding technique.

Multi-byte encoding makes it possible to represent small numbers in one byte, larger numbers in two bytes and very large numbers in however many bytes are necessary. This means that tags, which usually have a value less than 100, are stored as a single byte and sizes, which may be small or large, are stored in the most efficient manner. In effect, multi-byte encoding may be a compression technique.

Various types of multi-byte encoding are known. An example of multi-byte encoding is shown and works as follows:

a. Numbers less than 128 are encoded in one byte.
b. The most significant bit remains in the byte clear.
c. Multi-byte encoding interprets the most significant bit being clear to mean this may be the last byte in a number.
d. Numbers larger than 128 are broken up into 7 bit segments.
e. The 7 bit segments are then each stored in a byte.
f. And the most significant bit in each byte except the last may be set.

In other words, the system handles information such that:
a. Numbers less than $2^7$=128 are encoded in a single byte.
b. Numbers less than $2^{14}$=16384 are encoded in two bytes.
c. Numbers less than $2^{21}$=2097152 are encoded in three bytes.
d. Etc.

In general, bytes are processed until a byte with the most significant bit clear may be encountered. For example, the first number encountered may be the ink object identifier number. For version 1.0 this value may be "0" and can be encoded in a single byte. The next number may be the size of the stream following the size value, and for small ink objects as in the first example this will also be encoded in a single byte. However, if the stream may be long this value can grow as large as necessary. For example, a multi-byte encoded number of 10 bytes can represent a 64-bit number.

This same process may be applied to "tags" and other values in the stream. In general since "tags" are small integer indexes, they too may be one byte encoded.

Multi-byte Encoding of Signed Numbers

Multi-byte encoding as described above works well for positive integers. However, in some cases it may be necessary to store signed numbers. For example, the coordinates of a point may be positive or negative depending on where the application situates the origin.

To multi-byte encode a signed number, the absolute value of the signed number may be determined, the absolute value then may be shifted left by 1 bit, and the sign of the original number may be stored in the list significant bit.

Using the technique set forth above, the signed numbers with absolute values are handled as follows:
a. Numbers less than $2^6$=64 are encoded in one byte,
b. Numbers less than $2^{13}$=8192 are encoded in 2 bytes.
c. etc.

Further, ink may be compressed using known compression algorithms (for example, using Huffman compression systems and the like).

A Summarization of the Storage of Ink

A transform mapping may be stored in an ink object. The transform mapping permits the ink object to be stored in a first set of coordinates and later transformed to a second set of coordinates when needed.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

We claim:

1. A computer readable medium having a data structure stored thereon, said data structure being read and processed by a computer, said data structure for use with handwritten electronic ink for providing a standard ink framework, said handwritten electronic ink being data in a first ink capture space, said data structure comprising:

a first portion storing coordinate data relating to said handwritten electronic ink in said first ink capture space;

a second portion storing a first mapping of the first ink capture space to a virtual ink space, said virtual ink space relating to a coordinate system of an ink space rectangle, said first mapping for transforming the coordinate data in said first ink capture space to said virtual ink space defined by said standard ink framework, wherein said first mapping is of the form of:

$X'=ax+by+c$ $Y'=dx+ey+f;$ and a third portion storing a second mapping, said second mapping for transforming said virtual ink space to a display space, such that said second mapping is of the form of:

$X''=gx'+hy'+i$ $Y''=jx'+ky'+m$ such that combination of said first mapping and said second mapping is of the form of:

$X''=(ga+hd)x+(gb+he)y+gc+hf+i$ $Y''=(ja+kd)x+(jb+ke)y+jc+kf+m,$ said variables a, b, c, d, e, f, g, h, i, j, k, and m are coefficients that define the first and second mappings and said first and second mappings allowing said coordinate data to be rendered to said display space.

2. The computer readable medium according to claim 1, wherein the first and second portions are part of an ink object.

3. The computer readable medium according to claim 1, wherein the data include coordinate information for an ink stroke.

4. The computer readable medium according to claim 1, wherein the data include coordinate information for multiple ink strokes.

5. The computer readable medium according to claim 1, wherein the mapping is a set of equations.

6. The computer readable medium according to claim 1, wherein the mapping is a set of equations of the form $X'=ax+by+c$ $Y'=dx.+ey+f$ where (X,Y) is a coordinate of the data in said first ink capture space and (X',Y') is a coordinate of data in the virtual ink space.

7. The computer readable medium according to claim 1, wherein the first mapping is a set of coefficients.

8. The computer readable medium according to claim 1, wherein the first portion is part of an ink stroke and the second and third portions are part of a property table containing properties for the ink stroke.

9. The computer readable medium according to claim 8, wherein the property table includes a fourth portion for storing said first mapping of the coordinate data in said first ink capture space to a second virtual ink space.

10. The computer readable medium according to claim 8, wherein the property table includes a fourth portion for storing a third mapping of the coordinate data from said virtual ink space to a second display space.

* * * * *

UNITED STATES PATENT AND TRADEMARK OFFICE
CERTIFICATE OF CORRECTION

PATENT NO. : 7,006,711 B2
APPLICATION NO. : 09/891512
DATED : February 28, 2006
INVENTOR(S) : Dresevic et al.

It is certified that error appears in the above-identified patent and that said Letters Patent is hereby corrected as shown below:

Title Page;

On the face page, in field (56), under "Other Publications", in column 2, line 1, delete "Processiing" and insert -- Processing --, therefor.

On page 2, in field (56), under "U.S. Patent Documents", in column 2, line 19, after "6,549,675" delete "B1" and insert -- B2 --, therefor.

On page 2, in field (56), under "Other Publications", in column 2, line 8, after "Morrison" insert -- , --.

On page 2, in field (56), under "Other Publications", in column 2, line 10, delete "Ressource" and insert -- Resource --, therefor.

On page 3, in field (56), under "Other Publications", in column 1, line 12, delete "Ressource" and insert -- Resource --, therefor.

On page 3, in field (56), under "Other Publications", in column 1, line 25, after "May 10" insert -- , --.

On page 3, in field (56), under "Other Publications", in column 1, line 29, after "May 10" insert -- , --.

On page 3, in field (56), under "Other Publications", in column 1, line 32, after "May 10" insert -- , --.

On page 3, in field (56), under "Other Publications", in column 1, line 47, delete "processing.," and insert -- processing, --, therefor.

On page 3, in field (56), under "Other Publications", in column 1, line 48, delete "Mountainview" and insert -- Mountain View --, therefor.

On page 3, in field (56), under "Other Publications", in column 2, line 25, after "U–" delete "13".

On page 3, in field (56), under "Other Publications", in column 2, line 33, delete "Elecronic" and insert -- Electronic --, therefor.

UNITED STATES PATENT AND TRADEMARK OFFICE
CERTIFICATE OF CORRECTION

PATENT NO. : 7,006,711 B2
APPLICATION NO. : 09/891512
DATED : February 28, 2006
INVENTOR(S) : Dresevic et al.

It is certified that error appears in the above-identified patent and that said Letters Patent is hereby corrected as shown below:

On page 3, in field (56), under "Other Publications", in column 2, line 46, delete "Formal" and insert -- Format --, therefor.

On page 3, in field (56), under "Other Publications", in column 2, line 48, delete "ink" and insert -- Ink --, therefor.

On page 3, in field (56), under "Other Publications", in column 2, line 49, after "Format" delete "." and insert -- , --, therefor.

In column 6, line 67, after "thereof" insert -- . --.

In column 15, line 17, after "form of" insert -- : --.

In column 17, line 23, delete "TAG_TRANFORM" and insert -- TAG_TRANSFORM --, therefor.

In column 18, line 53, after "bytes" insert -- , --.

In column 20, line 26, in Claim 6, delete "Y'=dx.+ey+f" and insert -- Y'=dx+ey+f --, therefor.

Signed and Sealed this

Tenth Day of November, 2009

David J. Kappos
*Director of the United States Patent and Trademark Office*